United States Patent
Kato et al.

(10) Patent No.: US 11,938,898 B2
(45) Date of Patent: Mar. 26, 2024

(54) VEHICLE CONTROL SYSTEM

(71) Applicant: HONDA MOTOR CO., LTD., Tokyo (JP)

(72) Inventors: Hisahiro Kato, Tokyo (JP); Toshibumi Shiohata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 17/563,791

(22) Filed: Dec. 28, 2021

(65) Prior Publication Data
US 2022/0242367 A1    Aug. 4, 2022

(30) Foreign Application Priority Data

Feb. 2, 2021  (JP) ................. 2021-015081

(51) Int. Cl.
- B60R 25/24 (2013.01)
- B60R 25/01 (2013.01)
- G07C 9/00 (2020.01)
- H04L 12/40 (2006.01)

(52) U.S. Cl.
CPC ............. B60R 25/24 (2013.01); B60R 25/01 (2013.01); G07C 9/00309 (2013.01); H04L 12/40 (2013.01); B60R 2325/20 (2013.01); G07C 2009/00349 (2013.01); G07C 2009/00769 (2013.01); G07C 2209/63 (2013.01); H04L 2012/40273 (2013.01)

(58) Field of Classification Search
None
See application file for complete search history.

(56) References Cited

U.S. PATENT DOCUMENTS

| | | | | |
|---|---|---|---|---|
| 2006/0208856 A1* | 9/2006 | Nakashima | ............ | B60R 25/24 340/8.1 |
| 2007/0024121 A1* | 2/2007 | Teshima | ................ | B60R 25/245 307/10.2 |
| 2009/0085720 A1* | 4/2009 | Kurpinski | ............. | B60R 25/246 340/5.64 |
| 2015/0274126 A1* | 10/2015 | Nishiyama | ............ | B60R 25/245 701/2 |

FOREIGN PATENT DOCUMENTS

| | | |
|---|---|---|
| JP | 4085322 | 5/2008 |
| WO | 2014/136428 | 9/2014 |

OTHER PUBLICATIONS

Chinese Office Action dated Jan. 12, 2024, Chinese Application No. 202210102252.A, English translation included, 8 pages.

* cited by examiner

*Primary Examiner* — Thomas S McCormack
(74) *Attorney, Agent, or Firm* — Rankin, Hill & Clark LLP

(57) ABSTRACT

A vehicle control system includes an entry ECU that performs first authentication processing for access from an outside of a vehicle, a door control ECU that controls locking and unlocking of a door of the vehicle, and a central ECU, the entry ECU transmits a first startup request, which instructs to start up the central ECU, before executing the first authentication processing, and the central ECU transmits a second startup request which instructs to start up the door control ECU.

10 Claims, 15 Drawing Sheets

NORMAL MODE OPERATION

EARLY STARTUP MODE OPERATION

VEHICLE CONTROL SYSTEM

INCORPORATION BY REFERENCE

The present application claims priority under 35 U.S.C. § 119 to Japanese Patent Application No. 2021-015081 filed on Feb. 2, 2021. The content of the application is incorporated herein by reference in its entirety.

BACKGROUND OF THE INVENTION

Field of the Invention

The present invention relates to a vehicle control system in which a plurality of control devices are communicably connected to each other to control an unlocking operation of a vehicle door.

Description of the Related Art

A smart entry system is disclosed in WO 2014/136428 in which a vehicle can be locked even when a portable device is placed in the vehicle. In the smart entry system, when a user gives an instruction to lock the vehicle door, the door is locked and power is continuously supplied only to a preset in-vehicle device when a first portable device for storing first identification information exists outside the vehicle and a second portable device for storing second identification information exists inside the vehicle.

In addition, a smart entry system for the purpose of ensuring sufficient security and usability is disclosed in Japanese Patent No. 4085322 in which a door is automatically unlocked by a collation confirmation between a portable device owned by a user and a vehicle when a user's hand approaches a door handle. In such a smart entry system, when an in-vehicle electrical device does not continuously operate for a specified time or longer and signals can be transmitted and received to/from the portable device for a specified time or longer or a specified number of times or more, automatic unlocking cannot be performed by the portable device, and the unlocked door is locked.

In all the above-described smart entry systems according to the related art, locking and unlocking of the door are controlled by one control device (for example, a body control module (BCM)) having a user authentication function, an unauthorized operation prevention function, and a power supply control function.

On the other hand, such a smart entry system can be an intrusion route for an unauthorized operation by an unauthorized user. From the viewpoint of improving cyber security, the smart entry system is preferably configured such that a plurality of devices share a plurality of firewalls (unauthorized access prevention measures) between a door unlocking operation and a door locking operation.

For example, in recent years, a configuration has been known in which an ECU for sharing an interface with an outside environment of the vehicle and performing detection of a door handle operation and authentication of a door key and an ECU for sharing control of the inside of the vehicle and controlling locking and unlocking of the vehicle door are connected to different communication buses, respectively.

In such a configuration, an authentication function is provided in each of the ECU constituting the interface and the ECU for controlling the inside of the vehicle, whereby a plurality of firewalls can be constructed. Further, communication between these communication buses is controlled by a central ECU (management ECU) having a gateway function, whereby a firewall can also be constructed between communication related to vehicle access and communication related to vehicle control, and a robust system against cyber-attacks can be realized.

In the vehicle configuration of the related art in which the detection and authentication of the access from the outside of the vehicle and the control of the inside of the vehicle are shared and realized by the plurality of ECUs, a plurality of ECUs sharing various functions related to smart entry sequentially start to operate from a sleep state to a normal operating state according to a flow of processing related to the smart entry, thereby executing the processing.

However, since the startup of these ECUs requires a suitable starting time depending on the configuration of each of the ECUs, a decrease in responsiveness of the smart entry system is caused in such a vehicle configuration, and a commercial value of the vehicle may be reduced.

From the above background, in the vehicle control system in which a smart entry function is realized by a plurality of control devices, it is required to improve responsiveness from an unlocking instruction of the vehicle door to a completion of unlocking.

SUMMARY OF THE INVENTION

A first aspect of the present invention is to provide a vehicle control system mounted on a vehicle, the vehicle control system including: an entry ECU that detects access to the vehicle from an outside of the vehicle and executes first authentication processing on the access which is detected; a first communication bus to which the entry ECU is connected; a door control ECU that controls locking and unlocking of a door of the vehicle; a second communication bus to which the door control ECU is connected; and a central ECU having a gateway function of managing signal transmission between the first communication bus and the second communication bus, wherein the entry ECU transmits a first startup request, which instructs to start up the central ECU, to the central ECU before executing the first authentication processing when the access is detected, and the central ECU transmits a second startup request, which instructs to start up the door control ECU, to the door control ECU in response to reception of the first startup request.

According to a second aspect of the present invention, the entry ECU does not transmit the first startup request when the number of times of a result of the first authentication processing being consecutive failure exceeds a predetermined number of times.

According to a third aspect of the present invention, when the access is detected, the entry ECU performs the first authentication processing based on identification information received from a portable device existing within a range of a first predetermined distance from the vehicle.

According to a fourth aspect of the present invention, the entry ECU communicates with a portable device existing within a range of a second predetermined distance longer than the first predetermined distance from the vehicle, and executes second authentication processing based on identification information received from the portable device, and when a result of the second authentication processing is success, the entry ECU transmits the first startup request before executing the first authentication processing.

According to a fifth aspect of the present invention, the entry ECU communicates with a portable device existing within a range of a second predetermined distance longer than the first predetermined distance from the vehicle, and executes second authentication processing based on identification information received from the portable device, and when a result of the second authentication processing is failure, the entry ECU does not transmit the first startup request before executing the first authentication processing.

According to a sixth aspect of the present invention, the vehicle control system further includes a communication path between the entry ECU and the door control ECU without the central ECU, wherein the entry ECU transmits the result of the first authentication processing to the door control ECU via the communication path when malfunction of the central ECU is detected.

According to a seventh aspect of the present invention, the entry ECU is connected to the first communication bus and the second communication bus, and the communication path is the second communication bus.

According to an eighth aspect of the present invention, when the malfunction of the central ECU is detected, the entry ECU transmits the result of the first authentication processing to the door control ECU via the communication path without transmitting the startup request to the door control ECU via the communication path.

A ninth aspect of the present invention is to provide an entry ECU that processes access to a vehicle from an outside of the vehicle, the entry ECU including: an access detection unit that detects the access; an authentication processing unit that executes first authentication processing on the access which is detected; and a startup request unit that transmits a first startup request that instructs to start up another ECU, wherein the startup request unit transmits the startup request before execution of the first authentication processing when the access is detected.

A tenth aspect of the present invention is to provide a vehicle door to be assembled to a vehicle, the vehicle door including the entry ECU.

According to the aspects of the present invention, it is possible to improve responsiveness from the unlocking instruction of the vehicle door to the completion of unlocking in the vehicle control system in which a smart entry function is realized by a plurality of control devices.

DETAILED DESCRIPTION OF THE PREFERRED EMBODIMENT

Embodiments of the present invention will be described below with reference to the drawings.

First Embodiment

Figure 1:
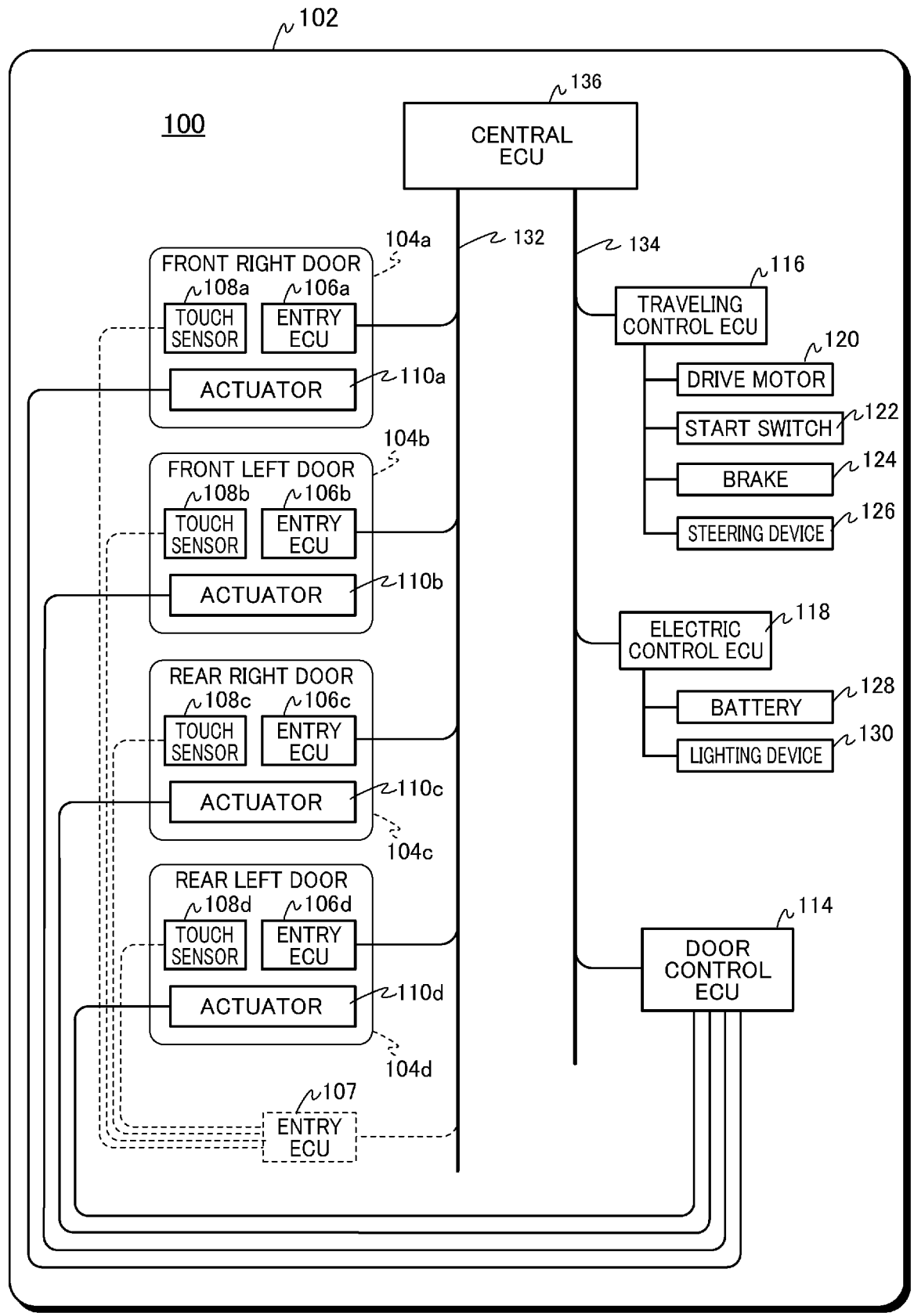
FIG. 1 is a diagram showing an example of a configuration of a vehicle control system according to a first embodiment of the present invention.

First, a first embodiment of the present invention will be described. FIG. 1 is a diagram showing an example of a vehicle control system according to a first embodiment of the present invention. A vehicle control system 100 shown in FIG. 1 is mounted on a host vehicle 102 (hereinafter, referred to as a vehicle 102), and is configured in which a plurality of control devices for controlling an operation of the vehicle 102 are connected to be able to communicate with each other. The vehicle control system 100 realizes a smart entry function by these plurality of control devices.

In the present embodiment, the control device is an electronic control unit (ECU). Further, the vehicle 102 is, for example, a 4-door electric vehicle in the present embodiment, and is assembled with four vehicle doors of a front right door 104a, a front left door 104b, a rear right door 104c, and a rear left door 104d.

The vehicle control system 100 includes entry ECUs 106a, 106b, 106c, and 106d that are arranged in the front right door 104a, the front left door 104b, the rear right door 104c, and the rear left door 104d, respectively. The front right door 104a, the front left door 104b, the rear right door 104c, and the rear left door 104d are provided with touch sensors 108a, 108b, 108c, and 108d configured to detect contact of an object (including a human hand) with door handles of these doors, respectively, and are also provided with actuators 110a, 110b, 110c, and 110d configured to drive door lock mechanisms of these doors to lock and unlock the doors, respectively.

In the following description, the front right door 104a, the front left door 104b, the rear right door 104c, and the rear left door 104d are collectively referred to as a door 104, and the entry ECUs 106a, 106b, 106c, and 106d are collectively referred to as an entry ECU 106. In the following description, the touch sensors 108a, 108b, 108c, and 108d are collectively referred to as a touch sensor 108, and the actuators 110a, 110b, 110c, and 110d are collectively referred to as an actuator 110.

In the present embodiment, as an example, each of the entry ECUs 106 is provided in each of the doors 104 and is configured to acquire a sensor output from the touch sensor 108 of each of the doors 104, but the configuration of the vehicle control system 100 is not limited thereto. As indicated by a dotted line in FIG. 1, one entry ECU 107 is provided in place of the entry ECUs 106 that are provided in the doors 104, respectively, and sensor outputs from all of the touch sensor 108 provided in the doors 104 may be acquired and processed by one entry ECU 107. The entry ECU 107 is arranged in a vehicle body other than the door 104, for example.

In the above-described embodiment, the doors 104 configured to detect access from the outside of the vehicle are assumed to be four seat doors of the vehicle 102, which is an electric vehicle, but the number of doors 104 is not limited to four. In addition, the door 104 is not limited to the seat door, and may be a trunk room door.

The entry ECU 106 detects the access to the vehicle 102 from the outside of the vehicle 102 and executes first authentication processing on the detected access. In the present embodiment, the access is contact (touch) of an object (for example, a human hand) to the door handle of the door 104, and the entry ECU 106 detects the access using the touch sensor 108 provided in the corresponding door 104. The first authentication processing will be described below.

The vehicle control system 100 further includes a door control ECU 114 that instructs the actuator 110 of the door 104 to operate. The door control ECU 114 can cause the actuator 110 to execute a locking operation and an unlocking operation by controlling power supply to the actuator 110, for example.

Here, the entry ECU 106 is an ECU that shares an interface with an outside environment of the vehicle, and the door control ECU 114 is an ECU that shares control of the inside of the vehicle. The vehicle control system 100 may include not only the door control ECU 114 but also another ECU that shares the control of the inside of the vehicle. As examples of such another ECU, FIG. 1 shows a traveling control ECU 116 configured to control traveling of the vehicle 102 and an electric control ECU 118 configured to control an electrical system of the vehicle 102.

The traveling control ECU 116 controls operations of a drive motor 120, a start switch 122, a brake 124, and a steering device 126. The drive motor 120 drives wheels of the vehicle 102 to cause the vehicle 102 to travel. The start switch 122 turns on power supply to the drive motor 120 and starts a traveling operation of the vehicle 102.

The electric control ECU 118 monitors states of a battery 128 and a lighting device 130 and controls operations thereof. The battery 128 supplies power to the drive motor 120 and supplies power to other electrical devices.

These ECUs, which share the in-vehicle control, operate in cooperation with each other, and can realize safe operation of starting traveling when the door is locked and an abnormality of the lighting device is not detected, for example.

The entry ECUs 106, which share the interface with the outside environment of the vehicle, are connected to a first communication bus 132, and the door control ECU 114, the traveling control ECU 116, and the electric control ECU 118, which share the in-vehicle control, are connected to a second communication bus 134. Further, the first communication bus 132 and the second communication bus 134 are connected to a central ECU 136. The central ECU 136 has a gateway function of managing signal transmission between the first communication bus 132 and the second communication bus 134.

The central ECU 136 receives a transmission message output onto the first communication bus 132 from the entry ECUs 106 which share the interface with the outside environment of the vehicle, and performs message authentication on the transmission message based on a message ID included in the transmission message, for example. The central ECU 136 can perform the message authentication by, for example, determining whether a device-unique code of a transmission source device indicated by the message ID of the transmission message matches a collation device code stored in advance.

The vehicle control system 100 may include not only the entry ECU 106, the door control ECU 114, the traveling control ECU 116, and the electric control ECU 118 shown in FIG. 1, but also other ECUs that share the interface with the outside environment of the vehicle and/or other ECUs that share the in-vehicle control.

The entry ECU 106, the door control ECU 114, the traveling control ECU 116, the electric control ECU 118, and other ECUs (hereinafter, also collectively referred to as ECUs constituting the vehicle control system 100) constituting the vehicle control system 100 communicate with each other according to a CAN-FD (Control Area Network with Flexible Data rate) communication standard via the first communication bus 132 and/or the second communication bus 134 which are CAN buses, for example.

Each of the entry ECU 106, the door control ECU 114, the traveling control ECU 116, the electric control ECU 118, and other ECUs constituting the vehicle control system 100 also include a CAN transceiver compatible with so-called partial networking, which enables selective wakeup (returning to a normal operating state from a sleep state) of the ECUs connected onto the bus. Thereby, these ECUs can execute startup processing, shift to a normal mode, and execute a predetermined operation when receiving the transmission message addressed to itself from the first communication bus 132 or the second communication bus 134 corresponding to the CAN transceivers included in these ECUs after satisfying predetermined conditions and shifting to a sleep mode (power saving mode).

Next, a smart entry operation (a door unlocking operation) in the vehicle control system 100 will be described. The vehicle control system 100 operates in two operation modes of a normal mode and an early startup mode. The normal mode is an operation mode in which each of the plurality of ECUs related to the door unlocking operation sequentially starts up and executes the processing in response to a reception of processing results at another ECU, as in the above-described related art. Further, the early startup mode is an operation mode in which the ECU operating first in the door unlocking operation starts up another ECU from a sleep state to a normal operating state to prepare for execution of the processing before completing its own processing.

For example, the entry ECU 106 operating first in the door unlocking operation can determine whether the vehicle control system 100 operates in the normal mode or in the early startup mode by referring to a setting of a mode selection flag stored in its own flash memory. Such a mode selection flag is set to the early startup mode as a default setting, and is set to the normal mode by the entry ECU 106 when the number of times of the result of the first authentication processing being consecutive failure exceeds a predetermined number of times, for example.

Figure 2:
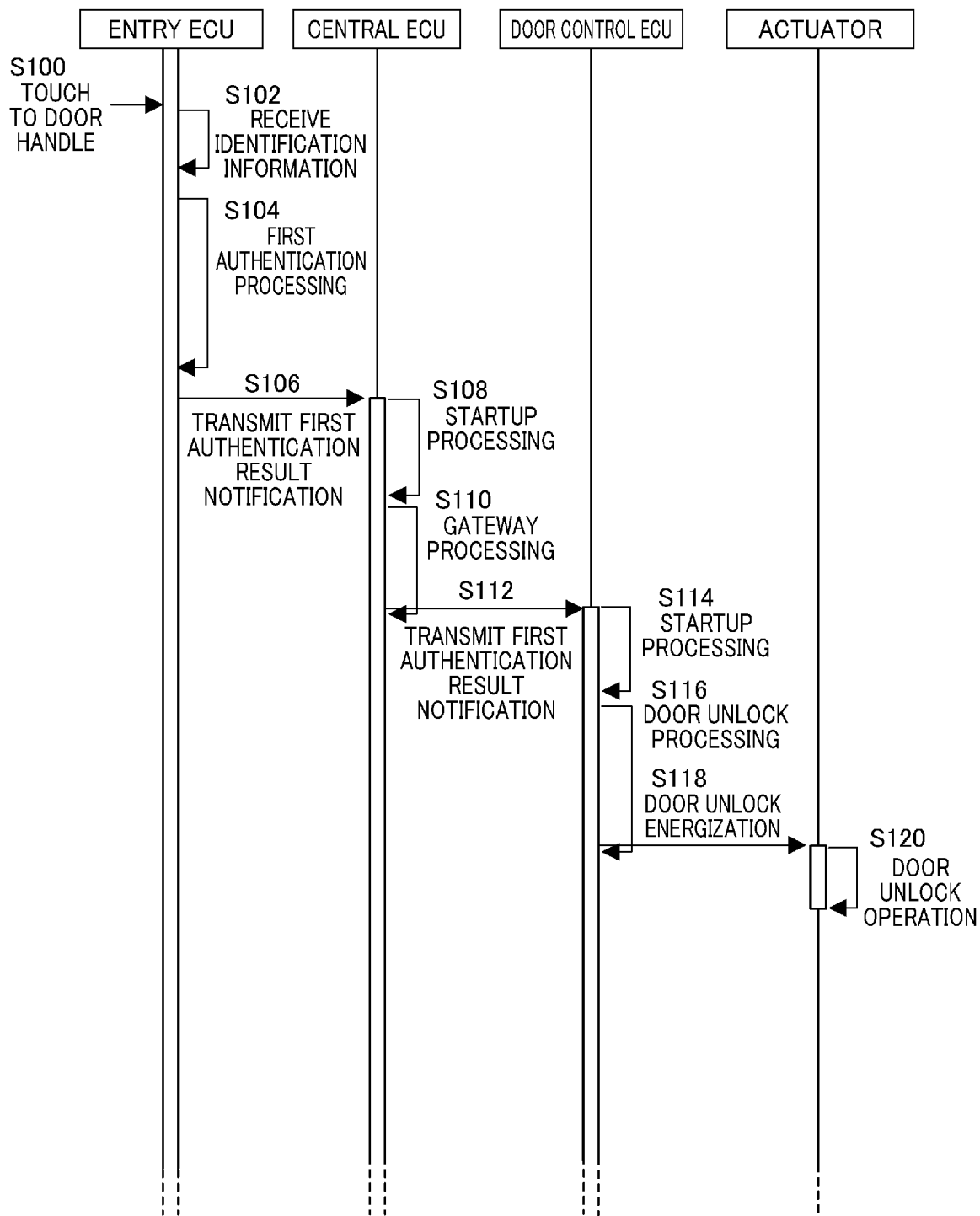
FIG. 2 is a sequence diagram showing a normal mode operation procedure of the vehicle control system shown in FIG. 1.

First, an operation of the normal mode in the vehicle control system 100 will be described with reference to a sequence diagram shown in FIG. 2. The operation shown in FIG. 2 is an operation of the normal mode when a person outside the vehicle accesses the vehicle 102 in a case where the vehicle 102 is in a parking state and the central ECU 136 and the door control ECU 114 are in a sleep state.

First, when a person outside the vehicle touches the door handle of the door 104 as access to the vehicle 102 (S100), the entry ECU 106 detects the touch using the touch sensor 108, and executes first authentication processing on the access. The first authentication processing is authentication processing for determining whether the person who touches the door handle is an authorized user who is allowed to unlock the door of the vehicle 102.

Specifically, the entry ECU 106 receives identification information from a portable device (that is, a portable device owned by a person within such a range) existing within a range of a first predetermined distance (for example, within 1 m) from the door 104 that has been accessed (that is, touched), using a communication device of its own (S102). In the present embodiment, the identification information is a key code of an electronic key stored in the portable device. The portable device may be an FOB key or a mobile phone such as a smartphone.

Then, the entry ECU 106 collates the received identification information with the collation identification information of the authorized user stored in advance to execute the first authentication processing (S104). When not discovering the portable device existing within the range of the first predetermined distance from the door 104 in S102, the entry ECU 106 ends the process without performing the first authentication processing. This prevents unnecessary processing from being performed due to contact with an object such as a dead leaf or touching the door handle by a person who does not have a portable device.

When the authentication succeeds (that is, when the received identification information matches any of the collation identification information) in the first authentication processing in S104, the entry ECU 106 transmits a first authentication result notification, which is a transmission message indicating that the authentication succeeds in the first authentication processing to the first communication bus 132 toward the door control ECU 114 (S106). Specifically, this communication is performed according to the CAN-FD communication standard described above.

Specifically, the first authentication result notification includes transmission data and a message ID. The transmission data may include not only data indicating that the authentication result in the first authentication processing is success, but also a device-unique code of the door control ECU 114 as a transmission destination and a device-unique code of the actuator 110 of the corresponding door 104. In addition, the message ID may include a content code indicating a data content of the transmission data and a device-unique code assigned to the entry ECU 106 which is the transmission source.

When the authentication result of the first authentication processing in S104 is failure, the entry ECU 106 does not transmit the first authentication result notification. Thus, the entry ECU 106 functions as a first firewall for access from the outside of the vehicle.

The central ECU 136, which has received the first authentication result notification transmitted in S106, executes self-startup processing to shift from a sleep state to a normal operating state (S108), and then executes gateway processing regarding the received first authentication result notification (S110). In the gateway processing, the central ECU 136 performs a message authentication on the first authentication result notification based on the message ID included in the received first authentication result notification. The central ECU 136 can perform the message authentication by determining whether the device-unique code of the transmission source device (the entry ECU 106 in this example) indicated by the message ID included in the first authentication result notification matches any of the collation device codes stored in advance, for example.

The central ECU 136 outputs the first authentication result notification, which is transmitted from the entry ECU 106 via the first communication bus 132, onto the second communication bus 134 (S112) when the result of the message authentication is success. When the result of the message authentication is failure in the gateway processing in S110, the central ECU 136 does not output the first authentication result notification onto the second communication bus 134. Thereby, the central ECU 136 functions as a second firewall for access from the outside of the vehicle.

The first authentication result notification output onto the second communication bus 134 from the entry ECU 106 is received by the door control ECU 114 on the second communication bus 134 according to the content code of the message ID included therein. In other words, the door control ECU 114 determines, based on the content code of the message ID included in the transmission message, whether the transmission message output onto the second communication bus 134 is a transmission message to be received by itself. The content code of the transmission message to be received by itself can be stored in the door control ECU 114 in advance.

The door control ECU 114, which receives the first authentication result notification sent to the second communication bus 134 in S112, executes self-startup processing to shift from a sleep state to a normal operating state (S114), and then executes door unlock processing (S116). In the door unlock processing, the door control ECU 114 specifies the actuator 110, which should be unlocked, by the device-unique code included in the transmission data of the received first authentication result notification. Further, the door control ECU 114 performs an operation target authentication by determining whether the device-unique code of the actuator 110 indicated by the device-unique code included in the transmission data of the first authentication result notification matches any of the collation device codes stored in advance.

Then, when the result of the operation target authentication is success, the door control ECU 114 executes energization (door unlock energization) for causing the actuator 110 of the specified door 104 to perform an unlock operation (S118). In the door unlock processing in S116, when the operation target authentication fails, the door control ECU 114 does not instruct the door unlock energization. Thereby, the door control ECU 114 functions as a third firewall for access from the outside of the vehicle.

By the door unlock energization in S118, the door unlock operation is performed in the corresponding actuator 110, that is, the actuator 110 of the door 104 accessed from the outside of the vehicle in S100 (S120). Thereby, a person who touches the door handle from the outside of the vehicle in S100 can open the door 104 corresponding to the touched door handle.

Next, an operation of the early startup mode in the vehicle control system 100 will be described with reference to a sequence diagram shown in FIG. 3. Similarly to the operation shown in FIG. 2, the operation shown in FIG. 3 is an operation when a person outside the vehicle accesses the vehicle 102 in a case where the vehicle 102 is in a parking state and the central ECU 136 and the door control ECU 114 are in a sleep state.

First, as in FIG. 2, when a person outside the vehicle touches the door handle of the door 104 (S200), the entry ECU 106 detects the touch using the touch sensor 108, and establishes communication with a portable device existing within the range of the first predetermined distance from the touched door 104 to receive identification information (S202). When the portable device does not exist within the range of the first predetermined distance, the entry ECU 106 ends the processing.

Then, when receiving the identification information, the entry ECU 106 collates the received identification information with the identification information of the authorized user stored in advance to execute the first authentication processing (S206).

Figure 3:
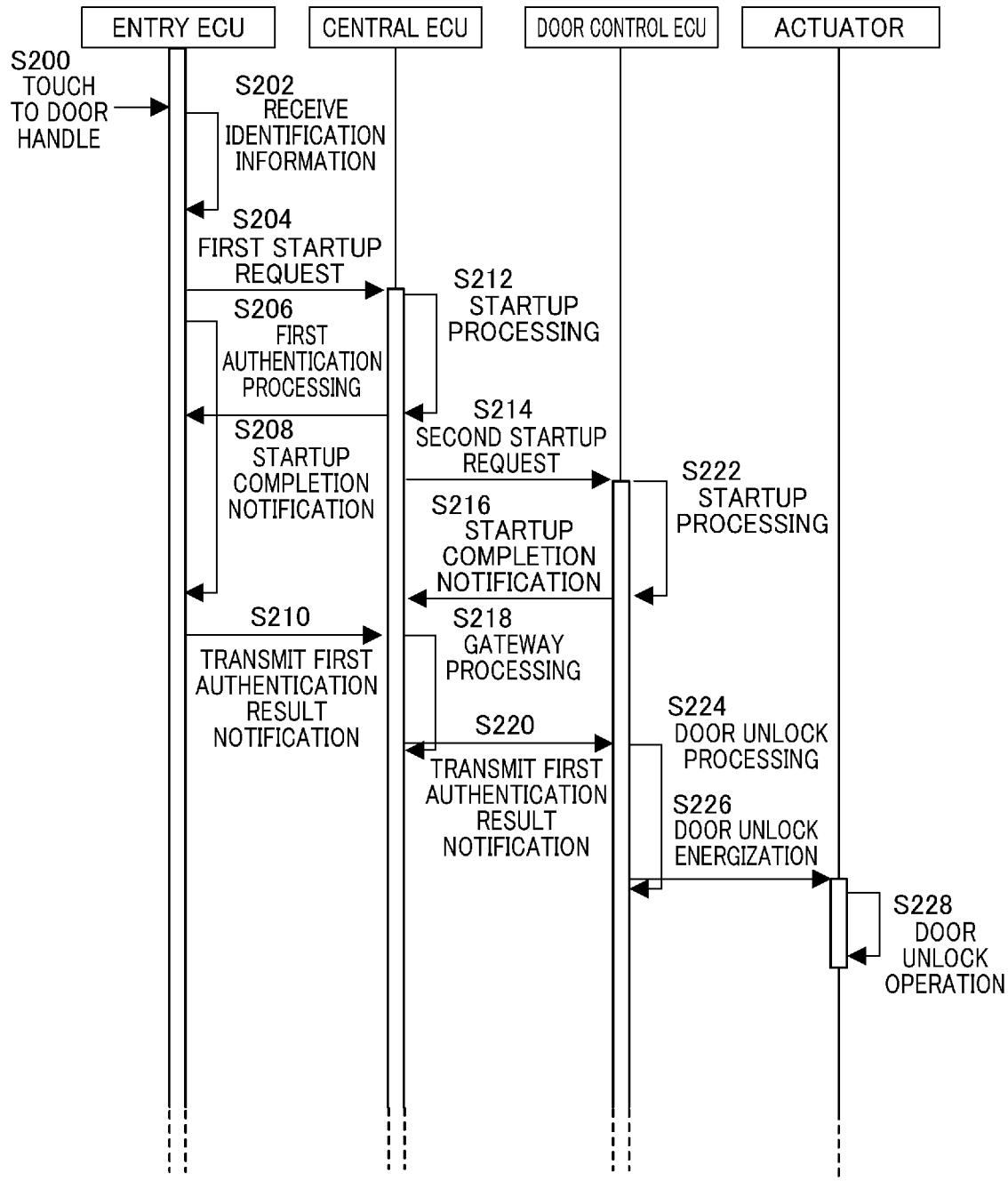
FIG. 3 is a sequence diagram showing an early startup mode operation procedure of the vehicle control system shown in FIG. 1.

However, unlike the normal mode operation shown in FIG. 2, in the early startup mode operation shown in FIG. 3, when detecting the touch from the outside of the vehicle in S200, the entry ECU 106 transmits a first startup request, which instructs to start up the central ECU 136, that is, the startup from the sleep state to the normal operating state, to the central ECU 136 before execution of the first authentication processing in S206 (S204).

The central ECU 136 executes self-startup processing in response to the reception of the first startup request (S212). Then, after completing the self-startup processing, the central ECU 136 transmits a startup completion notification to the entry ECU 106 (S208), and at the same time, transmits a second startup request, which instructs to start up the door control ECU 114, that is, the startup from the sleep state to the normal operating state, to the door control ECU 114 (S214).

Upon receiving the second startup request, the door control ECU 114 executes self-startup processing and shifts from the sleep state to the normal operating state (S222). In addition, after completing the startup processing, the door control ECU 114 transmits a startup completion notification to the central ECU 136 (S216).

After executing the first authentication processing started in S206, under conditions that the authentication succeeds in the first authentication processing and the startup completion notification is received from the central ECU 136 in S208, the entry ECU 106 transmits the first authentication result notification indicating that the authentication in the first authentication processing succeeds, to the first communication bus 132 toward the door control ECU 114 (S210). The first authentication result notification is the same as the first authentication result notification transmitted in S106 of the normal mode operation shown in FIG. 2 described above.

Upon receiving the first authentication result notification transmitted in S210, the central ECU 136 executes gateway processing on the received first authentication result notification (S218). The gateway processing is the same as the gateway processing executed in S110 of the normal mode operation shown in FIG. 2 described above, and involves a message authentication for the received first authentication result notification.

When the result of the message authentication is success, under conditions that the startup completion notification is received from the door control ECU 114 in S216, the central ECU 136 outputs the received first authentication result notification onto the second communication bus 134 (S220).

The first authentication result notification output onto the second communication bus 134 is received by the door control ECU 114 on the second communication bus 134 according to a content code of a message ID included therein.

Upon receiving the first authentication result notification output onto the second communication bus 134 by the central ECU 136 in S220, the door control ECU 114 executes a door unlock processing (S224), and performs door unlock energization on the actuator 110 (S226). Then, the actuator 110 subjected to the door unlock energization performs a door unlock operation to unlock the corresponding door 104 (S228). The door unlock processing in S224, the door unlock energization in S226, and the door unlock operation in S228 are the same as the door unlock processing in S116, the door unlock energization in S118, and the door unlock operation S120 of the normal mode operation shown in FIG. 2 described above, respectively.

Thereby, a person who touches the door handle from the outside of the vehicle in S100 can open the door 104 corresponding to the touched door handle.

In the early startup mode described above, the first startup request may be transmitted from the entry ECU 106 to the central ECU 136 before the reception of the identification information in S202 after the touch detection in S200. However, when the first startup request is transmitted before the reception of the identification information, since the central ECU 136 and the door control ECU 114 unnecessarily start up even when a touch by a person without a portable device or contact with an object such as a dead leaf flying in the wind is detected, it is desirable that the first startup request is transmitted after the reception of the identification information in S202, as shown in FIG. 3.

In the early startup mode in the vehicle control system 100 described above, when detecting the access to the vehicle 102 from the outside of the vehicle (for example, a touch of a human hand on the door handle) when the other ECUs constituting the vehicle control system 100 are in a sleep state, the entry ECU 106 transmits the first startup request to the central ECU 136 before execution of the first authentication processing for determining whether the access is performed by the authorized user.

Then, in response to the reception of the first startup request, the central ECU 136 transmits the second startup request, which instructs to start up, to the door control ECU 114. Thereby, the central ECU 136 and the door control ECU 114 is ready to execute the processing before receiving the first authentication result notification from the entry ECU 106.

Therefore, in the early startup mode of the vehicle control system 100, responsiveness from the operation of the door handle by the user to the completion of door unlocking is improved compared with the existing operation in which the central ECU 136 and the door control ECU 114 are sequentially started in response to the reception of the first authentication result notification, that is, the normal mode operation.

Next, a description will be given with respect to the configurations of the entry ECU 106, the central ECU 136, and the door control ECU 114 constituting the vehicle control system 100.

Figure 4:
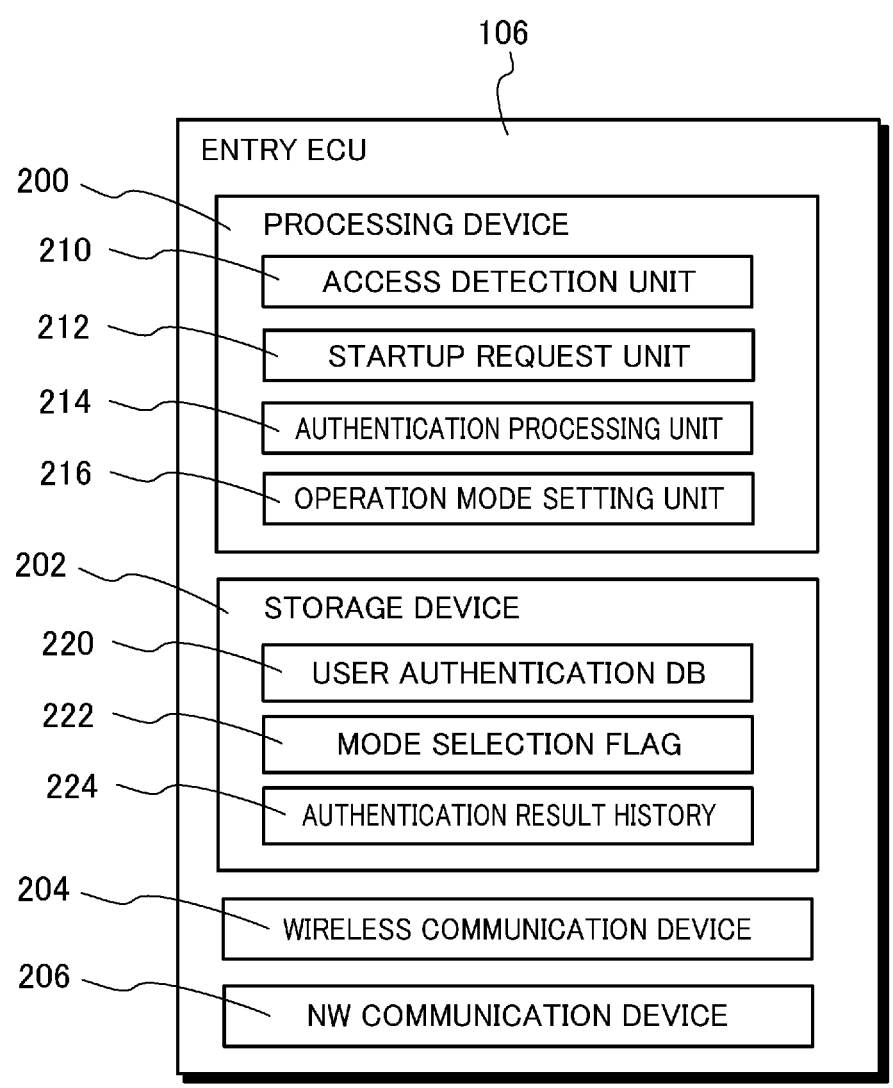
FIG. 4 is a diagram showing an example of a configuration of an entry ECU of the vehicle control system shown in FIG. 1.

First, the configuration of the entry ECU 106 will be described. FIG. 4 is a diagram showing an example of the configuration of the entry ECU 106. Each of the entry ECUs 106a, 106b, 106c, and 106d shown in FIG. 1 has the same configuration as the entry ECU 106 shown in FIG. 4. Here, in the following description with respect to FIG. 4, the door 104 indicates the door 104 in which the entry ECU 106 shown in FIG. 4 is arranged, and the touch sensor 108 and the actuator 110 indicate the touch sensor 108 and the actuator 110 which are provided in the door 104.

The entry ECU 106 includes a processing device 200, a storage device 202, a wireless communication device 204, and a NW communication device (network communication device) 206. The storage device 202 is configured by, for example, a rewritable non-volatile semiconductor memory, and stores a user authentication DB (user authentication database) 220, a mode selection flag 222, and an authentication result history 224.

The user authentication DB 220 records identification information as collation identification information that is assigned in advance to a user who is allowed to unlock the door 104 of the vehicle 102. The identification information assigned in advance is also stored in advance in the portable device possessed by the user. Here, the portable device may be any portable device capable of storing identification information, and may be, for example, a vehicle key such as an FOB key and/or a mobile terminal such as a smartphone as described above.

The mode selection flag 222 is a flag for determining whether to operate the vehicle control system 100 in the normal mode or in the early startup mode. The mode selection flag 222 is set to either a normal mode value (for example, "0 (zero)") indicating the normal mode operation or an early startup mode value (for example, "1") indicating the early startup mode. In the present embodiment, the mode selection flag 222 is set to the normal mode value as a default. In addition, the mode selection flag 222 is set to be switched between the normal mode value and the early startup mode value by an operation mode setting unit 216 which will be described below.

The wireless communication device 204 is a wireless transmitter/receiver for communicating with the portable device owned by the user, and performs wireless communication in conformity with a Bluetooth (registered trademark) communication standard, for example. The wireless communication device 204 can detect a distance up to the portable device by triangulation using a direction detection function of two Bluetooth receivers provided at different positions in the door 104.

The NW communication device 206 is a communication device for communicating with another ECU via the first communication bus 132, and has a function of enabling selective wakeup of the ECU connected onto the bus. For example, the NW communication device 206 is, a CAN transceiver that performs CAN-FD communication compatible with so-called partial networking.

The processing device 200 is a computer including a processor such as a central processing unit (CPU). The processing device 200 may have a configuration including a read only memory (ROM) in which a program is written and a random access memory (RAM) for temporarily storing data. The processing device 200 includes an access detection unit 210, a startup request unit 212, an authentication processing unit 214, and an operation mode setting unit 216 as functional elements or functional units.

These functional elements of the processing device 200 are realized, for example, by the processing device 200, which is a computer, executing a program. The computer program can be stored in any computer-readable storage medium. Alternatively, all or part of the functional elements of the processing device 200 may be configured by hardware including one or more electronic circuit components.

The access detection unit 210 detects access to the vehicle 102 from the outside of the vehicle. In the present embodiment, the access is a touch to the door handle of the door 104 of the vehicle 102, and the access detection unit 210 detects the touch to the door handle of the door 104 using the touch sensor 108 included in the door 104.

The startup request unit 212 refers to the mode selection flag 222 recorded in the storage device 202 in response to the fact that the access detection unit 210 detects the access to the vehicle 102. Then, the startup request unit 212 transmits the first startup request, which is a startup request (wakeup request) for the central ECU 136, onto the first communication bus 132 when the mode selection flag 222 is set to the early startup mode value and the authentication processing unit 214 to be described below receives the identification information from the portable device existing within the range of the first predetermined distance from the door 104.

Further, when transmitting the first startup request, the startup request unit 212 receives the startup completion notification to be transmitted onto the first communication bus 132, using the NW communication device 206, after the central ECU 136 completes the startup.

In response to the fact that the access detection unit 210 detects the access to the vehicle 102, the authentication processing unit 214 performs the first authentication processing on the access. The first authentication processing is authentication processing for determining whether the subject of the access is an authorized user who is allowed to unlock the door of the vehicle 102.

Specifically, in response to the fact that the access detection unit 210 detects the access to the vehicle 102, the authentication processing unit 214 first searches for the portable device existing within the range of the first predetermined distance (for example, 1 m) from the door 104 by the wireless communication device 204. When discovering the portable device existing within the range of the first predetermined distance from the door 104, the authentication processing unit 214 establishes wireless communication with the discovered portable device, and receives the identification information stored in the portable device.

Here, when discovering a plurality of portable devices existing within the range of the first predetermined distance from the door 104, the authentication processing unit 214 can establish communication with a portable device closest to the door 104 and receive the identification information.

Next, the authentication processing unit 214 refers to the user authentication DB 220 stored in the storage device 202, and determines whether the identification information received from the portable device within the range of the first predetermined distance matches any of the collation identification information recorded in the user authentication DB 220. Then, the authentication processing unit 214 determines that the authentication result of the first authentication processing is success when the identification information received from the portable device matches any of the collation identification information, and determines that the authentication result is failure when the identification information received from the portable device does not match any of the collation identification information.

The authentication processing unit 214 causes the authentication result of the first authentication processing to be stored together with the current time in the authentication result history 224 stored in the storage device 202.

Thereafter, when the result of the first authentication processing is success, the authentication processing unit 214 refers to the mode selection flag 222 stored in the storage device 202. Then, when the mode selection flag 222 is set to the normal mode value, the authentication processing unit 214 transmits the first authentication result notification, which is a transmission message indicating that the authentication in the first authentication processing succeeds, to the first communication bus 132 toward the door control ECU 114.

On the other hand, when the mode selection flag 222 is set to the early startup mode value, the authentication processing unit 214 inquires of the startup request unit 212 about whether the startup completion notification is received from the central ECU 136. Then, the authentication processing unit 214 transmits the first authentication result notification to the first communication bus 132 toward the door control ECU 114 under a condition that the startup request unit 212 receives the startup completion notification from the central ECU 136. When the startup request unit 212 does not receive the startup completion notification from the central ECU 136, the authentication processing unit 214 waits for the transmission of the first authentication result notification until the startup completion notification is received.

The operation mode setting unit 216 refers to the authentication result history 224 after the authentication processing unit 214 records the result of the first authentication processing in the authentication result history 224. The operation mode setting unit 216 determines, based on the authentication result history 224, whether the number of times of the result of the first authentication processing being consecutive failure exceeds a predetermined number of times. Then, the operation mode setting unit 216 sets the mode selection flag 222 stored in the storage device 202 to the normal mode value when the number of times of consecutive authentication failures exceeds a predetermined number of times.

Thereby, depending on the parking environment of the vehicle 102, when there is a lot of traffic and an unspecified person frequently touches the door handle, or when dead leaves flying in the wind in the park frequently touch the door handle, it is possible to prevent the central ECU 136 and the door control ECU 114 from being started up unnecessarily by the early startup mode.

Figure 5:
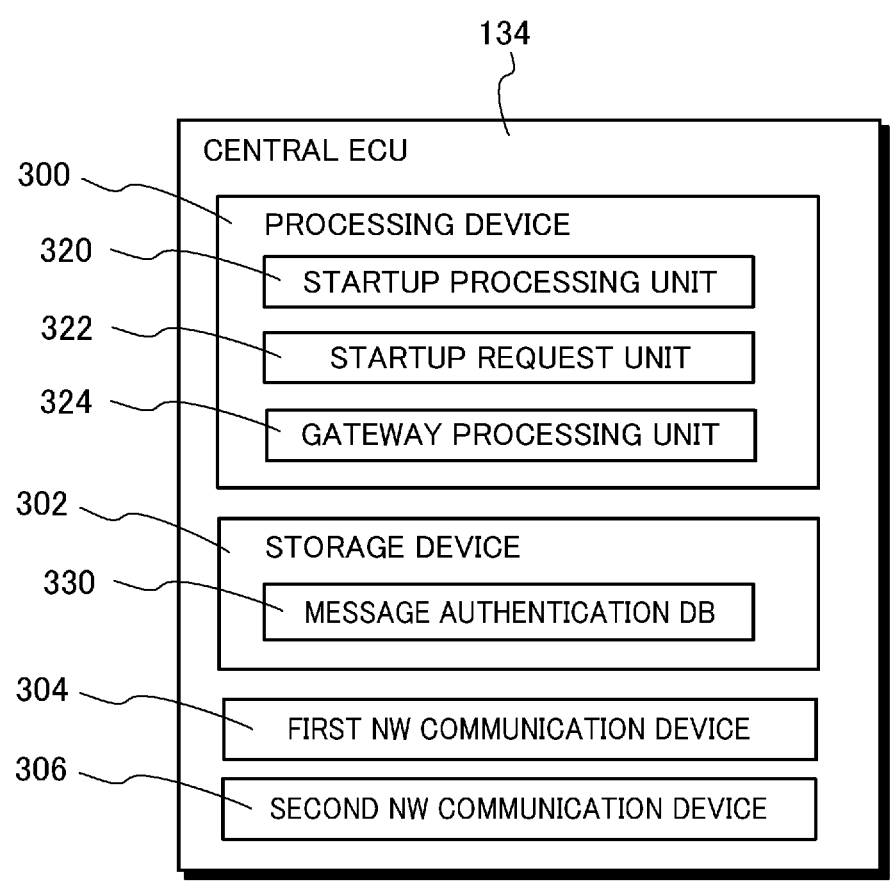
FIG. 5 is a diagram showing an example of a configuration of a central ECU of the vehicle control system shown in FIG. 1.

Next, the configuration of the central ECU 136 will be described. FIG. 5 is a diagram showing an example of the configuration of the central ECU 136. The central ECU 136 includes a processing device 300, a storage device 302, a first NW communication device (first network communication device) 304, and a second NW communication device (second network communication device) 306. The storage device 302 is configured by, for example, a rewritable non-volatile semiconductor memory, and stores a message authentication DB (message authentication database) 330. The message authentication DB 330 records a device unique ID as a collation device code assigned in advance to each of the ECUs constituting the vehicle control system 100. Each of the ECUs stores the device-unique code assigned in advance to itself, and when a transmission message is transmitted to the first communication bus 132 or the second communication bus 134, a device-unique code of own device is included in a message ID, which is a part of the transmission message, for example.

The first NW communication device 304 is a transmitter/receiver for communicating with another ECU via the first communication bus 132. Further, the second NW communication device 306 is a transmitter/receiver for communicating with another ECU via the second communication bus 134. Each of the first NW communication device 304 and the second NW communication device 306 is the transmitter/receiver having a function of enabling selective wakeup of the ECU connected onto the bus, similarly to the NW communication device 206 of the entry ECU 106 shown in FIG. 4. For example, each of the first NW communication device 304 and the second NW communication device 306 is a CAN transceiver that performs CAN-FD communication compatible with partial networking.

In particular, the first NW communication device 304 gives a wakeup instruction to the processing device 300 when receiving the first startup request from the first communication bus 132 when the processing device 300 is in the sleep state.

The processing device 300 is a computer including a processor such as a CPU. The processing device 300 may have a configuration including a ROM in which a program is written and a RAM for temporarily storing data. Then, the processing device 300 includes a startup processing unit 320, a startup request unit 322, and a gateway processing unit 324 as functional elements or functional units.

These functional elements of the processing device 300 are realized, for example, by the processing device 300, which is a computer, executing a program. The computer program can be stored in any computer-readable storage medium. Alternatively, all or part of the functional elements of the processing device 300 may be configured by hardware including one or more electronic circuit components.

In response to the fact that the processing device 300 receives the wakeup instruction from the first NW communication device 304, the startup processing unit 320 executes a startup process of returning the processing device 300 to the normal operating state from the sleep state. Thereby, the startup request unit 322 and the gateway processing unit 324 start operating.

After the completion of the startup processing, the startup processing unit 320 inquires of the first NW communication device 304 about whether the first startup request is received. When the first startup request is received, the startup processing unit 320 determines that the wakeup instruction is due to the first startup request received from the first communication bus 132. Then, when the wakeup instruction is due to the reception of the first startup request, the startup processing unit 320 notifies the startup request unit 322 and the gateway processing unit 324 of a startup factor notification indicating a startup based on the first startup request.

When receiving the startup factor notification from the startup processing unit 320 after the start of the operation, the startup request unit 322 transmits a second startup request to the door control ECU 114 via the second communication bus 134 using the second NW communication device 306.

Further, when the second startup request is transmitted, the startup request unit 322 receives the startup completion notification transmitted from the door control ECU 114 thereafter.

The gateway processing unit 324 performs gateway processing. In the gateway processing, the gateway processing unit 324 controls a transfer of the transmission message between the first communication bus 132 and the second communication bus 134. Specifically, when receiving the transmission message from each of the first communication bus 132 and the second communication bus 134, the gateway processing unit 324 performs a message authentication on the transmission message based on a message ID included in the transmission message.

The gateway processing unit 324 performs the message authentication by determining whether a device-unique code included in the message ID of the transmission message matches any of the collation device codes stored in advance in the message authentication DB 330 of the storage device 302.

When the result of the message authentication for the transmission message (for example, the first authentication result notification transmitted by the entry ECU 106) received from the first communication bus 132 is success, the gateway processing unit 324 sends the received transmission message to the second communication bus 134. In addition, when the result of the message authentication for the transmission message received from the second communication bus 134 is success, the gateway processing unit 324 sends the received transmission message to the first communication bus 132.

Figure 6:
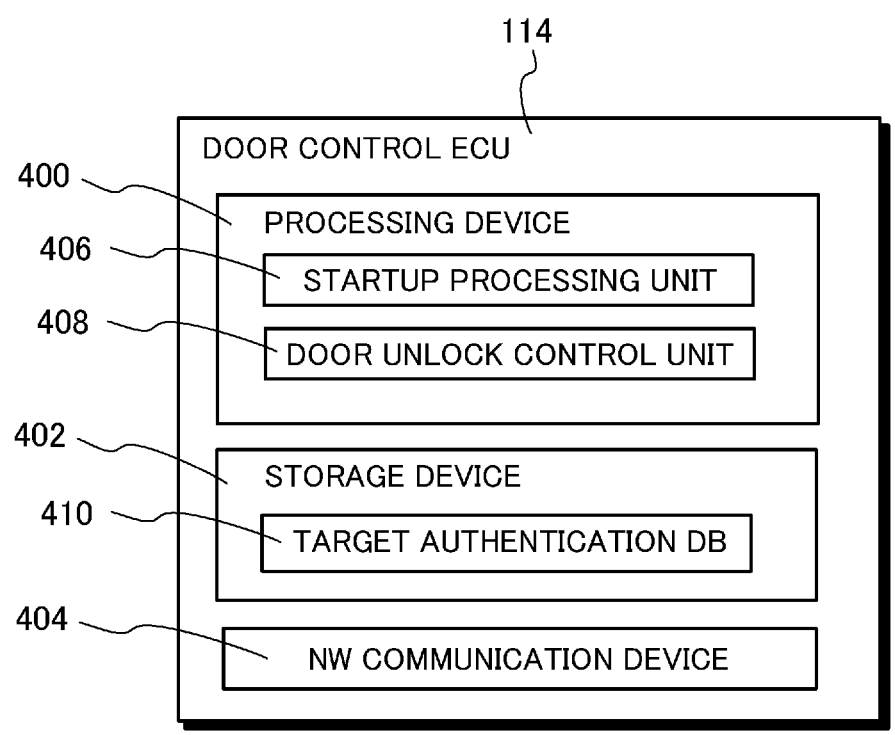
FIG. 6 is a diagram showing an example of a configuration of a door control ECU of the vehicle control system shown in FIG. 1.

Next, the configuration of the door control ECU 114 will be described. FIG. 6 is a diagram showing an example of the configuration of the door control ECU 114. The door control ECU 114 includes a processing device 400, a storage device 402, and a NW communication device (network communication device) 404. The storage device 402 is configured by, for example, a rewritable non-volatile semiconductor memory, and stores a target authentication DB (target authentication database) 410. The target authentication DB 410 records a device unique ID as a collation device code assigned in advance to each of the actuators 110 of each of the doors 104.

The NW communication device 404 is a transmitter/receiver for communicating with another ECU via the second communication bus 134. The NW communication device 404 is similar to the NW communication device 206 of the entry ECU 106 shown in FIG. 4, and is a transmitter/receiver having a function of enabling selective wakeup of the ECU connected onto the bus. For example, the NW communication device 404 is a CAN transceiver that performs CAN-FD communication compatible with partial networking.

In particular, the NW communication device 404 gives a wakeup instruction to the processing device 400 when receiving the second startup request from the second communication bus 134 when the processing device 400 is in the sleep state.

The processing device 400 is a computer including a processor such as a CPU. The processing device 400 may have a configuration including a ROM in which a program is written and a RAM for temporarily storing data. Then, the processing device 400 includes a startup processing unit 406 and a door unlock control unit 408 as functional elements or functional units.

In response to the fact that the processing device 400 receives the wakeup instruction from the NW communication device 404, the startup processing unit 406 executes startup processing of returning the processing device 400 to the normal operating state from the sleep state. Thereby, the door unlock control unit 408 starts operating.

The door unlock control unit 408 receives the first authentication result notification from the entry ECU 106 using the NW communication device 404. In addition, the door unlock control unit 408 performs a door unlock processing in response to the fact that the first authentication result notification is received. In the door unlock processing, the door control ECU 114 performs an operation target authentication by determining whether the device-unique code included in the transmission data of the received first authentication result notification matches any of the collation device codes stored in advance. Further, the door control ECU 114 specifies the actuator 110, which should be unlocked, by the device-unique code included in the transmission data of the received first authentication result notification.

Then, when the result of the operation target authentication is success, the door control ECU 114 executes energization (door unlock energization) for causing the specified actuator 110 of the door 104 to be unlocked.

Next, a description will be given with reference to each of flowcharts shown in FIGS. 7, 8, and 9 with respect to each of the operations of the entry ECU 106, the central ECU 136, and the door control ECU 114 constituting the vehicle control system 100.

First, the operation of the entry ECU 106 will be described. FIG. 7 is a flowchart showing an operation procedure of the entry ECU 106. A process shown in FIG. 7 starts when the power of the entry ECU 106 is turned on, and ends when the power is turned off.

When the process starts, first, the access detection unit 210 of the entry ECU 106 monitors the sensor signal from the touch sensor 108, and determines whether there is access to the door 104 from the outside of the vehicle, specifically, there is an operation on the door handle (more specifically, a contact with the door handle from the outside of the vehicle) (S300).

Then, when there is no operation on the door handle from the outside of the vehicle (NO in S300), the process returns to step S300, and the entry ECU 106 waits for the operation on the door handle. On the other hand, when there is the operation on the door handle from the outside of the vehicle (YES in S300), the authentication processing unit 214 determines using the wireless communication device 204 whether the portable device exists within the range of the first predetermined distance (for example, 1 m) from the door 104 (S302).

Then, when there is no portable device within the range of the first predetermined distance from the door 104 (NO in S302), the authentication processing unit 214 returns the process to step S300. On the other hand, when there is a portable device within the range of the first predetermined distance from the door 104 (YES in S302), the authentication processing unit 214 receives identification information from the portable device (S304). Next, the startup request unit 212 refers to the mode selection flag 222 stored in the storage device 202, and determines whether the mode selection flag 222 is set to the early startup mode value (S306).

Then, when the mode selection flag 222 is set to the early startup mode value (YES in S306), the startup request unit 212 sends the first startup request to the first communication bus 132 toward the central ECU 136 (S308). The transmission of the first startup request corresponds to step S204 shown in FIG. 3, whereby the vehicle control system 100 executes the early startup mode operation according to the sequence diagram shown in FIG. 3.

After the startup request unit 212 transmits the first startup request in step S308, the authentication processing unit 214 executes first authentication processing on the access from the outside of the vehicle detected in step S300 (S310). Specifically, the authentication processing unit 214 determines whether the identification information received in step S304 matches any of the collation identification information stored in the user authentication DB 220 of the storage device 202.

The authentication processing unit 214 determines that the authentication result of the first authentication processing is success when the received identification information matches any of the collation identification information, and determines that the authentication result is failure when the received identification information does not match any of the collation identification information. Then, the authentication processing unit 214 causes the result of the first authentication processing to be stored in the authentication result history 224 of the storage device 202 (S312).

Next, the operation mode setting unit 216 refers to the authentication result history 224 stored in the storage device 202, and determines whether the number of times of the result of the first authentication processing being consecutive failure exceeds a predetermined number of times (S314). Then, when the number of times of consecutive authentication failures exceeds the predetermined number of times (YES in S314), the operation mode setting unit 216 sets the mode selection flag 222 stored in the storage device 202 to the normal mode value (S316), and the process returns to step S318. Thereby, for example, when the vehicle 102 is parked in a narrow place with a lot of traffic and the body of a person who is not an authorized user of the vehicle 102 repeatedly contacts with the door handle of the door 104, it is possible to prevent the central ECU 136 and the door control ECU 114 from being started up unnecessarily. As a result, unnecessary power consumption generated in the central ECU 136 and the door control ECU 114 due to such startup is avoided.

On the other hand, in step S314, when the number of times of consecutive authentication failures is equal to or less than the predetermined number of times (NO in S314), the operation mode setting unit 216 does not set the mode selection flag 222 to the normal mode value, and the process proceeds to step S318.

Next, in step S318, the authentication processing unit 214 inquires of the startup request unit 212, and determines whether the startup completion notification is received from the central ECU 136. Then, when the startup completion notification is not received from the central ECU 136 (NO in S318), the process returns to step S318, and the authentication processing unit 214 waits until the startup completion notification is received from the central ECU 136.

On the other hand, in step S318, the startup completion notification is received from the central ECU 136 (YES in S318), the authentication processing unit 214 returns the process to step S328.

On the other hand, in step S306, when the mode selection flag 222 is not set to the early startup mode value (NO in S306), the authentication processing unit 214 performs the first authentication processing (S320), and then records the result of the first authentication processing in the authentication result history 224 (S322) in the same manner as in steps S310 and S312 described above without transmitting the first startup request to the central ECU 136 using the startup request unit 212. Further, the operation mode setting unit 216 refers to the authentication result history 224, and determines whether the number of times of the result of the first authentication processing being consecutive failure exceeds a predetermined number of times (S324).

Then, when the number of times of consecutive authentication failures exceeds the predetermined number of times (YES in S324), the operation mode setting unit 216 sets the mode selection flag 222 to the normal mode value (S326). Then, the authentication processing unit 214 does not determine whether the startup completion notification is received from the central ECU 136, and the process proceeds to step S328.

On the other hand, in step S324, the number of times of consecutive authentication failures is equal to or less than the predetermined number of times (NO in S324), the operation mode setting unit 216 does not set the mode selection flag 222 to the normal mode value, and the process proceeds to step S328.

In step S328, the authentication processing unit 214 and the operation mode setting unit 216 determines whether the authentication result of the first authentication processing in step S310 or S320 is success (S328). Then, when the authentication result of the first authentication processing is success (YES in S328), the operation mode setting unit 216 sets the mode selection flag 222 to the early startup mode value (S330). Further, the authentication processing unit 214 sends the first authentication result notification indicating that the authentication result of the first authentication processing is success to the first communication bus 132 toward the door control ECU 114 (S332), and the process returns to step S300.

Next, the operation of the central ECU 136 will be described. FIG. 8 is a flowchart showing an operation procedure in the central ECU 136 when there is access (for example, an operation on the door handle) to the vehicle 102 from the outside of the vehicle in a case where the vehicle 102 is in a parking state and the central ECU 136 is in a sleep mode. The processing flow shown in FIG. 8 starts when the power of the central ECU 136 is turned on. However, it is assumed in FIG. 8 that the central ECU 136 shifts to the sleep state with the parking of the vehicle 102 before step S400 after the start of the processing.

Figure 8:
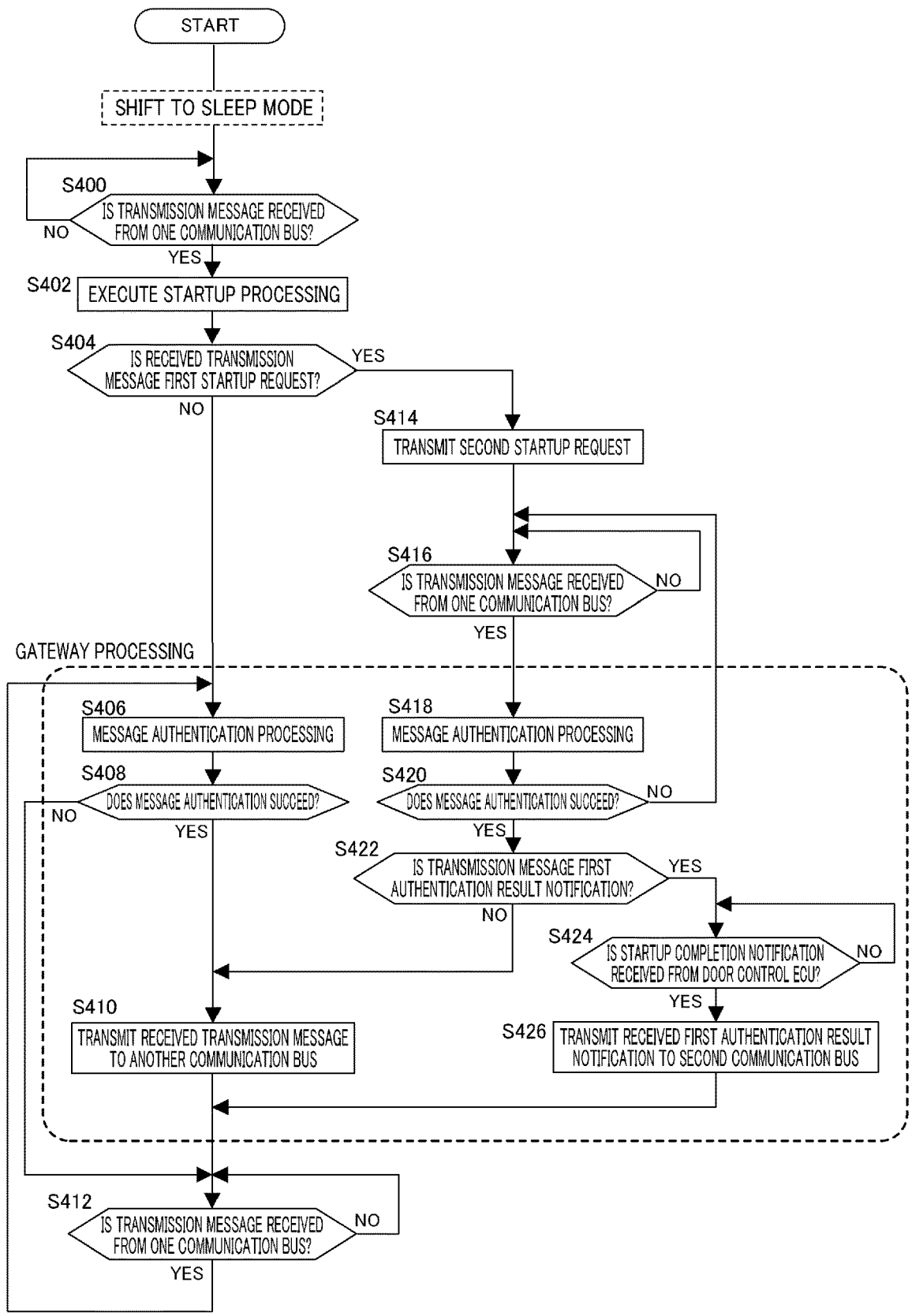
FIG. 8 is a flowchart showing an operation procedure of the central ECU shown in FIG. 5.

In FIG. 8, when the process shifts to the sleep mode after the start of the process, the central ECU 136 determines whether the transmission message transmitted by another ECU is received from one communication bus of the first communication bus 132 and the second communication bus 134 (S400) by the first NW communication device 304 and the second NW communication device 306. Then, when the transmission message is not received from any communication bus (NO in S400), the process returns to step S400, and the central ECU 136 waits until the transmission message is received from any communication bus.

On the other hand, when the transmission message transmitted by another ECU is received from one communication bus of the first communication bus 132 and the second communication bus 134 (YES in S400), the first NW communication device 304 or the second NW communication device 306, which has received the transmission message, instructs the processing device 300 to execute the startup from the sleep mode to the normal mode. The processing device 300 instructed to execute the startup executes the startup processing using the startup processing unit 320 (S402). Then, when the startup processing is completed, the startup request unit 322 determines whether the transmission message received in step S400 is the first startup request received from the entry ECU 106 via the first communication bus 132 (S404).

Then, when the transmission message received in step S400 is not the first startup request received from the entry ECU 106 (NO in S404), the central ECU 136 does not transmit the second startup request to the door control ECU 114, and starts gateway processing (processing within a rectangle shown by a dotted line) using the gateway processing unit 324.

For example, when the entry ECU 106 transmits the result of the first authentication processing without transmitting the first startup request according to the normal mode value set in the mode selection flag 222, the central ECU 136 determines NO in step S404. Thus, since the central ECU 136 executes the gateway processing without transmitting the second startup request to the door control ECU 114, the vehicle control system 100 operates in the normal mode shown in FIG. 2.

In the gateway processing, first, the gateway processing unit 324 performs message authentication processing on the transmission message received from one communication bus in step S400 (S406). Details of the message authentication processing are as described above.

Subsequently, the gateway processing unit 324 determines whether the result of the message authentication in step S406 is success (S408). Then, when the result of the message authentication is success (YES in S410), the gateway processing unit 324 sends the transmission message received from one communication bus of the first communication bus 132 and the second communication bus 134 in step S400 to the other communication bus (S410). Thereby, the gateway processing for the transmission message received in step S400 is completed.

Subsequently, the central ECU 136 determines whether a new transmission message transmitted by another ECU is received from one communication bus of the first communication bus 132 and the second communication bus 134 by the first NW communication device 304 and the second NW communication device 306 (S412). Then, when the new transmission message is not received (NO in S412), the process returns to step S412, and the central ECU 136 waits until a new transmission message is received from any communication bus. On the other hand, when the new transmission message is received from one communication bus (YES in S412), the process returns to step S406, and the gateway processing unit 324 performs gateway processing on the received new transmission message.

On the other hand, in step S408, when the result of the message authentication is failure (NO in S408), the gateway processing unit 324 discards the transmission message failing in the message authentication and ends the gateway processing, and the process proceeds to step S412.

On the other hand, in step S404, when the transmission message received in step S400 is the first startup request from the entry ECU 106 (YES in S404), the startup request unit 322 sends the second startup request, which instructs to start up the door control ECU 114, to the second communication bus 134 toward the door control ECU 114 by the second NW communication device 306 (S414). Thereafter, when the door control ECU 114 transmits the startup completion notification via the second communication bus 134, the startup request unit 322 receives the startup completion notification by the second NW communication device 306.

Thus, for example, when the entry ECU 106 transmits the first startup request to the central ECU 136 according to the early startup mode value set in the mode selection flag 222, the central ECU 136 determines YES in step S404. Thereby, since the central ECU 136 transmits the second startup request to the door control ECU 114, the vehicle control system 100 operates in the early startup mode shown in FIG. 3.

Subsequently, the central ECU 136 determines whether a new transmission message transmitted by another ECU is received from one communication bus of the first communication bus 132 and the second communication bus 134 by the first NW communication device 304 and the second NW communication device 306 (S416). Then, when the transmission message is not received from any communication bus (NO in S416), the process returns to step S416, and the central ECU 136 waits until a new transmission message is received from any communication bus.

On the other hand, when the transmission message is received from any one of the communication buses (YES in S416), the gateway processing unit 324 executes gateway processing within a rectangle shown by a dotted line. Specifically, the gateway processing unit 324 performs message authentication processing on the transmission message received from one communication bus in step S416 (S418).

Subsequently, the gateway processing unit 324 determines whether the result of the message authentication in step S418 is success (S420). Then, when the result of the message authentication is failure (NO in S420), the gateway processing unit 324 discards the transmission message failing in the message authentication, and the process returns to step S416. On the other hand, when the result of the message authentication is success (YES in S420), the gateway processing unit 324 determines whether the transmission message succeeding in the message authentication is the first authentication result notification received from the entry ECU 106 via the first communication bus 132 (S422).

Then, when the transmission message succeeding in the message authentication is the first authentication result notification (YES in S422), the gateway processing unit 324 inquires of the startup request unit 322, and determines whether the startup completion notification is received from the door control ECU 114 (S424). Then, when the startup completion notification is not received from the door control ECU 114 (NO in S424), the process returns to step S424, and the gateway processing unit 324 waits until the startup request unit 322 receives the startup completion notification from the door control ECU 114.

On the other hand, when the startup completion notification is received from the door control ECU 114 (YES in S424), the gateway processing unit 324 sends the first authentication result notification (that is, the transmission message determined to be the first authentication result notification in S422) received from the first communication bus 132 in S416, to the second communication bus 134 (S426).

Thus, the first authentication result notification transmitted by the entry ECU 106 following the first startup request is received in step S416 and is sent to the second communication bus 134 toward the door control ECU 114 in step S426. Thus, the operation of the central ECU 136 in the early operation mode ends, and normal gateway processing is started.

Thereafter, the process proceeds to step S412, and the gateway processing unit 324 waits until a new transmission message is received from any one of the first communication bus 132 and the second communication bus 134.

On the other hand, in step S418, when the transmission message succeeding in the message authentication is not the first authentication result notification (NO in S422), the gateway processing unit 324 shifts the process to step S410.

After executing the process in step S412, the central ECU 136 repeats the gateway processing starting from step S406, and then shifts to the sleep mode when a predetermined condition is satisfied due to the vehicle 102 being parked. After the shift to the sleep mode, the central ECU 136 starts the operation again from step S400.

Next, the operation of the door control ECU 114 will be described. FIG. 9 is a flowchart showing an operation procedure in the door control ECU 114 when there is access (for example, an operation on the door handle) to the vehicle 102 from the outside of the vehicle in a case where the vehicle 102 is in a parking state and the door control ECU 114 is in a sleep mode. The processing flow shown in FIG. 9 starts when the power of the door control ECU 114 is turned on. However, it is assumed in FIG. 9 that the door control ECU 114 shifts to the sleep state with the parking of the vehicle 102 before step S500 after the start of the processing.

Figure 9:
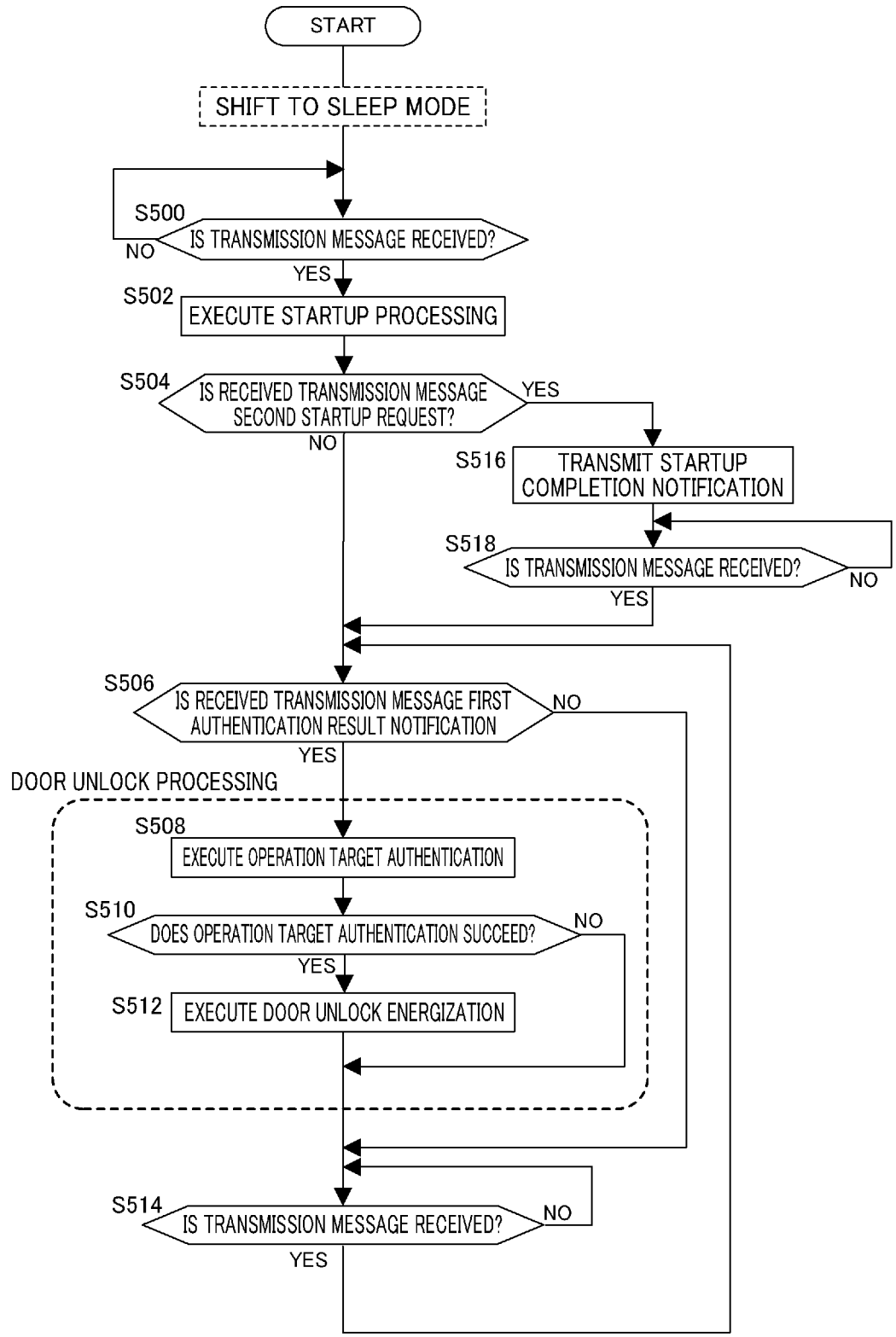
FIG. 9 is a flowchart showing an operation procedure of the door control ECU shown in FIG. 6.

In FIG. 9, when the process shifts to the sleep mode after the start of the process, the door control ECU 114 determines whether the NW communication device 404 receives a transmission message transmitted from another ECU, which should be received by itself, from the second communication bus 134 (S500). Then, when the transmission message is not received (NO in S500), the process returns to step S500, and central ECU 136 waits until the transmission message is received. As described above, the door control ECU 114 can determine whether the transmission message is a transmission message, which should be received, based on the content code included in the message ID of the transmission message arriving via the second communication bus 134.

On the other hand, when the transmission message to be received is received (S500), the NW communication device 404 instructs the processing device 400 to start the operation from the sleep mode to the normal mode. The processing device 400 instructed to execute the operation executes startup processing using the startup processing unit 406 (S502). Then, when the startup process is completed, the startup processing unit 406 determines whether the received transmission message is the second startup request (S504). Then, when the received transmission message is not the second startup request (NO in S504), the startup processing unit 406 determines whether the received transmission message is the first authentication result notification (S506).

Then, when the received transmission message is the first authentication result notification (YES in S506), the door unlock control unit 408 executes a door unlock processing (including respective steps in a rectangle shown by a broken line).

In the door unlock processing, the door unlock control unit 408 performs an operation target authentication based on the received first authentication result notification (S508).

Subsequently, the door unlock control unit 408 determines whether the result of the operation target authentication is success (S510). Then, when the result of the operation target authentication is success (YES in S510), the door unlock control unit 408 specifies the actuator of the door 104 to be the operation target, based on the received first authentication result notification. Then, the door unlock control unit 408 executes energization (door unlock energization) for causing the specified actuator 110 of the door 104 to be unlocked (S512). Thus, the door unlock control unit 408 ends the door unlock processing, and the process proceeds to step S514.

In step S514, the processing device 400 inquires of the NW communication device 404, and determines whether a new transmission message is received. Then, when the new transmission message is not received (NO in S514), the process returns to step S514, and the processing device 400 waits until a new transmission message is received.

On the other hand, when the new transmission message is received (YES in S514), the process returns to step S506, and the processing device 400 repeats the process.

On the other hand, in step S506, when the received transmission message is not the first authentication result notification (NO in S506), the door unlock control unit 408 does not perform the door unlock processing, and the process proceeds to step S514.

On the other hand, in step S504, when the transmission message received in step S500 is the second startup request (YES in S504), the startup processing unit 406 sends the startup completion notification to the second communication bus 134 toward the central ECU 136 (S516). Subsequently, the processing device 400 inquires of the NW communication device 404, and determines whether a new transmission message is received (S518).

Then, when the new transmission message is not received (NO in S518), the process returns to step S518, and the processing device 400 waits until a new transmission message is received. On the other hand, when the new transmission message is received (YES in S518), the processing device 400 shifts the process to step S506.

After executing the process in step S514, the door control ECU 114 shifts to the sleep mode when a predetermined condition is satisfied due to the vehicle 102 being parked while repeating the processes from step S506 to step S514. After the shift to the sleep mode, the door control ECU 114 starts the operation again from step S500.

Modification of First Embodiment

The vehicle control system 100 of the first embodiment describe above operates in the early startup mode as a default setting operates according to the setting of the mode selection flag 222 managed by the operation mode setting unit 216 of the entry ECU 106, and operates in the normal mode when the number of times the result of the first authentication processing being consecutive failure exceeds the predetermined number of times. However, the change condition of the operation mode in the vehicle control system 100 is not limited to the number of times of consecutive failures in the first authentication processing.

As a modification, the vehicle control system 100 may be set to the early startup mode when the entry ECU 106 discovers a portable device of the authorized user who is allowed to unlock the door within a range of a second predetermined distance longer than the first predetermined distance from the door 104.

Specifically, as a modification, the entry ECU 106 receives identification information transmitted from the portable device existing within the range of the second predetermined distance from the door 104, and executes second authentication processing on the received identification information. The second authentication processing is a process of determining based on the received identification information whether the portable device is a portable device of the authorized user. Then, when the result of the second authentication processing is success, the entry ECU 106 may transmit a first startup request to the central ECU 136 when there is access to the vehicle 102 from the outside of the vehicle. Thereby, the vehicle control system 100 may be set to operate in the early startup mode under the condition that the authorized user exists within the range of the second predetermined distance from the door 104.

Figure 10:
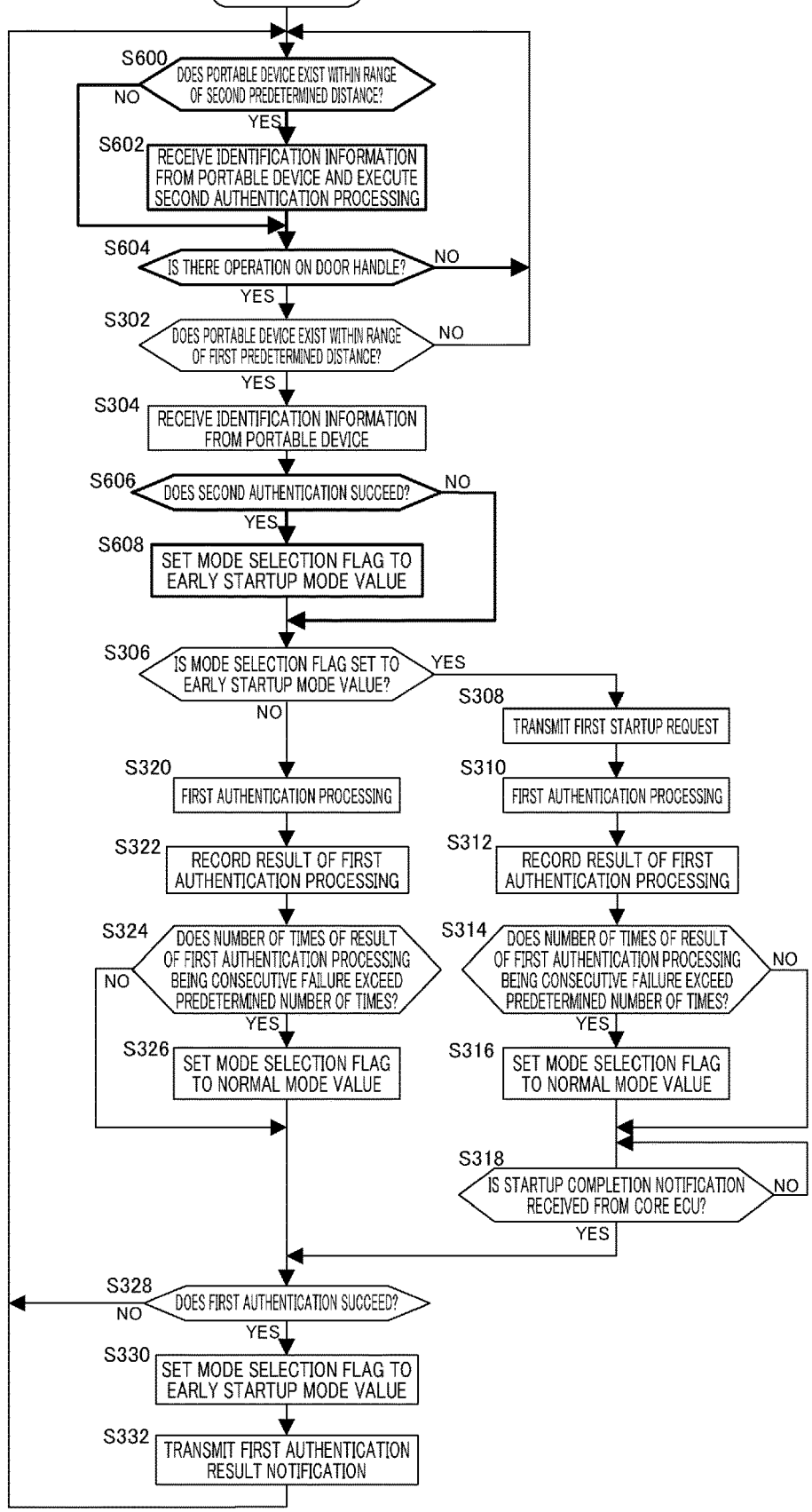
FIG. 10 is a flowchart showing an operation procedure according to a modification of the entry ECU shown in FIG. 4.

FIG. 10 is a flowchart showing a processing procedure in the modification of such an entry ECU 106. In FIG. 10, steps equal to steps in the flowchart shown in FIG. 7 are denoted the same reference numerals, and quote the description of FIG. 7. In the following description of FIG. 10, unless otherwise specified, the entry ECU 106 refers to the entry ECU 106 according to the modification described above.

Figure 7:
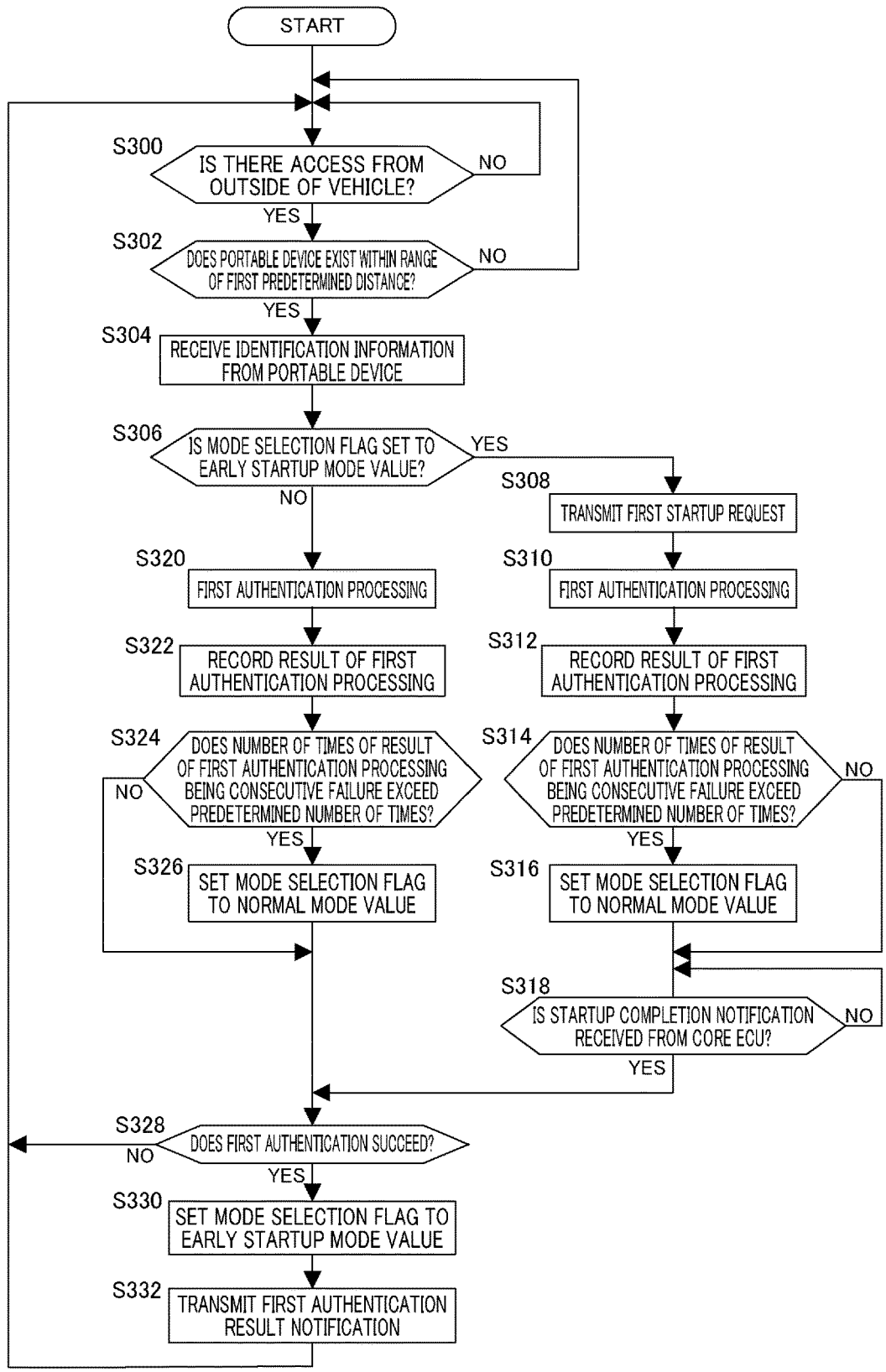
FIG. 7 is a flowchart showing an operation procedure of the entry ECU shown in FIG. 4.

A process shown in FIG. 10 is similar to the process shown in FIG. 7, except that steps S600, S602, S606, and S608 are further included as additional steps and step S604 is included instead of step S300. Hereinafter, steps S600, S602, S604, S606, and S608 will be described.

In FIG. 10, when the process starts, the authentication processing unit 214 of the entry ECU 106 determines whether there is a portable device capable of communicating with the wireless communication device 204 within the range of the second predetermined distance from the door 104 (S600). Here, the second predetermined distance is set to be longer than the first predetermined distance. For example, the first predetermined distance is 1 m, and the second predetermined distance is 5 m.

Then, when there is a portable device capable of communicating within the range of the second predetermined distance (YES in S600), the authentication processing unit 214 communicates with the portable device, and receives identification information from the portable device. Then, the authentication processing unit 214 executes second authentication processing based on the received identification information (S602), and then the process proceeds to step S604.

In the second authentication processing of step S602, the authentication processing unit 214 collates the received identification information with collation identification information recorded in the user authentication DB 220 of the storage device 202. Then, the authentication processing unit 214 determines that the result of the second authentication is success when the received identification information matches any of the collation identification information, and determines that the result of the second authentication is failure when the received identification information does not match any of the collation identification information.

On the other hand, when there is no portable device capable of communicating within the range of the second predetermined distance in step S600 (NO in S600), the authentication processing unit 214 shifts the process to step S604.

In step S604, as in step S300, the access detection unit 210 monitors the sensor signal from the touch sensor 108, and determines whether there is access to the door 104 from the outside of the vehicle, specifically, there is an operation on the door handle (S604).

Then, when there is the operation on the door handle (YES in S604), the access detection unit 210 shifts the process to step S302. On the other hand, when there is no operation on the door handle (NO in S604), the access detection unit 210 returns the process to step S600.

In addition, after the authentication processing unit 214 receives the identification information from the portable device existing within the first predetermined distance from the door 104 in step S304, the operation mode setting unit 216 determines whether the result of the second authentication processing performed in step S602 is success (S606).

Then, when the result of the second authentication processing is success (YES in S606), the operation mode setting unit 216 sets the mode selection flag 222 recorded in the storage device 202 to the early startup mode (S608), and then the process proceeds to step S306. On the other hand, when the result of the second authentication processing is failure (NO in S606), the operation mode setting unit 216 does not set the mode selection flag 222, and the process proceeds to step S306.

Second Embodiment

Figure 11:
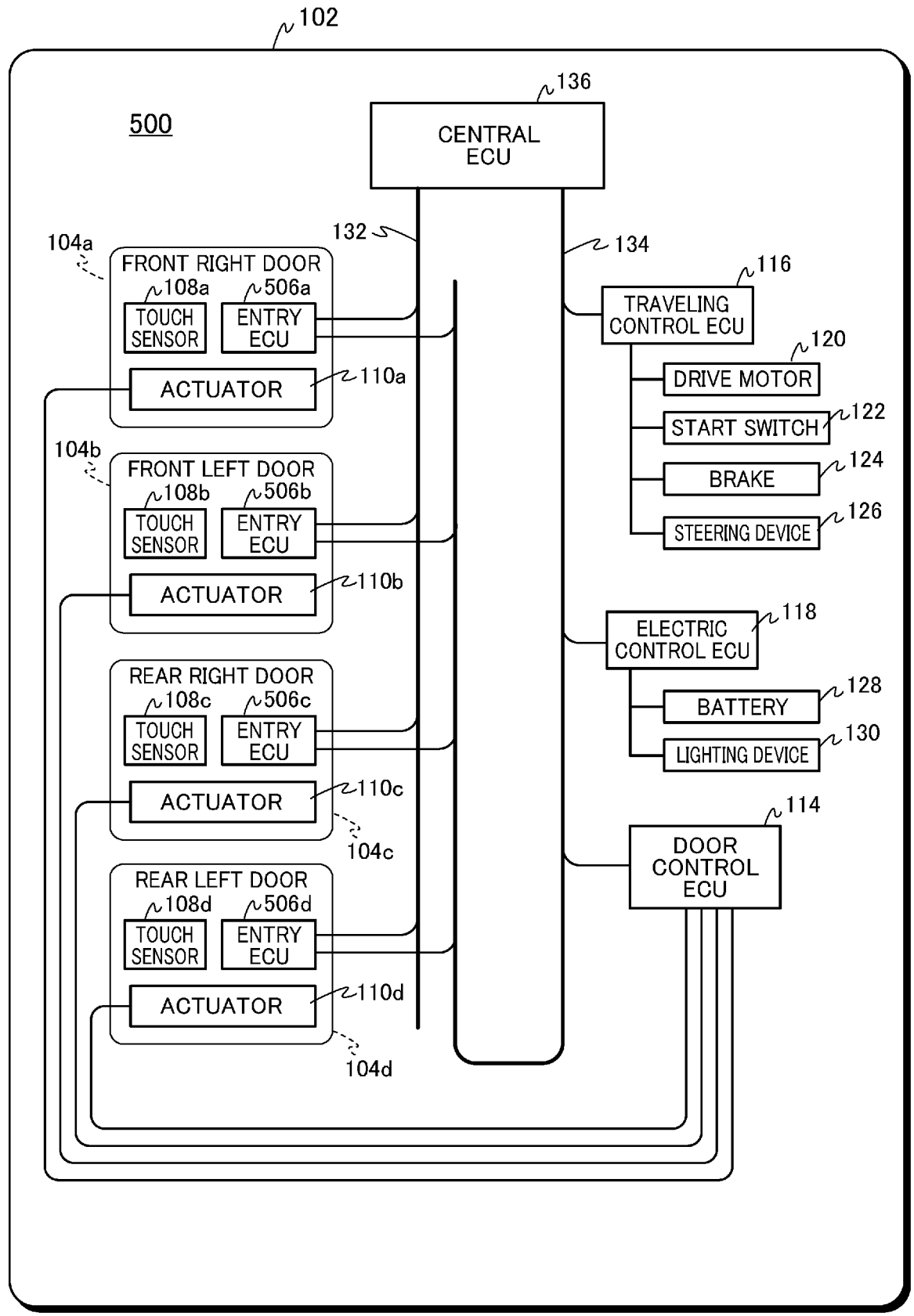
FIG. 11 is a diagram showing an example of a configuration of a vehicle control system according to a second embodiment of the present invention.

Next, a second embodiment of the present invention will be described. FIG. 11 is a diagram showing an example of a vehicle control system according to the second embodiment of the present invention. In FIG. 11, the same components as those of the vehicle control system 100 shown in FIG. 1 are denoted by the same reference numerals as those in FIG. 1, and will quote the description of FIG. 1 described above.

A vehicle control system 500 shown in FIG. 11 has the same configuration as the vehicle control system 100 shown in FIG. 1, except for including entry ECUs 506a, 506b, 506c, and 506d instead of the entry ECUs 106a, 106b, 106c, and 106d. Hereinafter, the entry ECUs 506a, 506b, 506c, and 506d are collectively referred to as an entry ECU 506.

The entry ECU 506 is connected to the first communication bus 132 as in the entry ECU 106 in FIG. 1, but is also further connected to the second communication bus 134.

Similarly to the vehicle control system 100 shown in FIG. 1, the vehicle control system 500 shown in FIG. 11 executes the normal mode operation shown in FIG. 2 and the early startup mode operation shown in FIG. 3. However, the vehicle control system 500 further performs an emergency mode operation when the central ECU 136 cannot perform the gateway processing due to malfunction. In an emergency mode, the entry ECU 506 directly transmits the first authentication result notification to the door control ECU 114 via the second communication bus 134.

Figure 12:
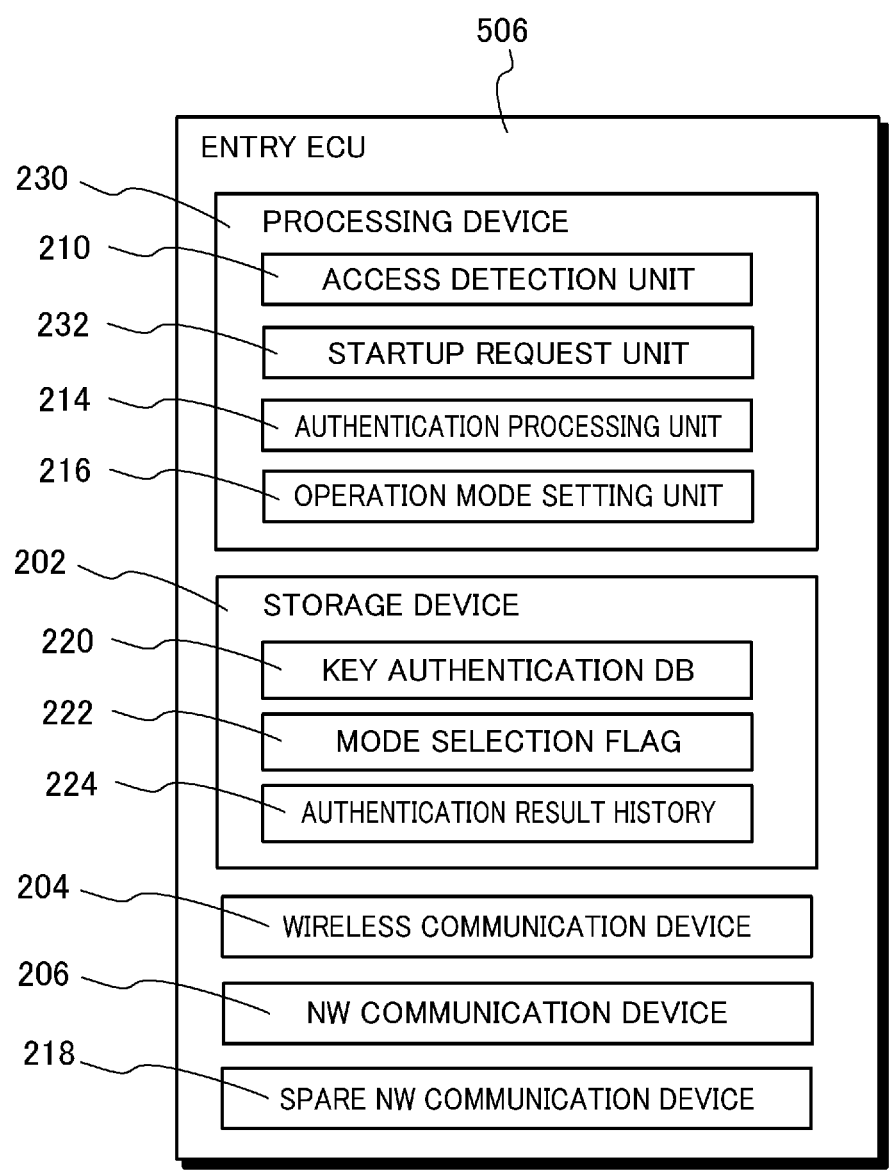
FIG. 12 is a diagram showing an example of a configuration of an entry ECU of the vehicle control system shown in FIG. 11.

FIG. 12 is a diagram showing a configuration of the entry ECU 506. In FIG. 12, the same components as those of the entry ECU 106 shown in FIG. 4 are denoted by the same reference numerals as those in FIG. 4, and will quote the description of FIG. 4 described above.

The entry ECU 506 shown in FIG. 12 has the same configuration as the entry ECU 106 shown in FIG. 4, except that a processing device 230 is provided instead of the processing device 200. In addition, the entry ECU 506 shown in FIG. 12 is different from the entry ECU 106 shown in FIG. 4 in that a spare NW communication device 218 is provided in addition to the NW communication device 206.

The spare NW communication device 218 is connected to the second communication bus 134 and communicates with other ECUs via the second communication bus 134. Similarly to the NW communication device 206, the spare NW communication device 218 is, for example, a CAN transceiver that performs CAN-FD communication compatible with partial networking, and has a function of enabling selective wakeup of the ECU connected onto the bus.

The processing device 230 has the same configuration as the processing device 200, except that a startup request unit 232 is provided instead of the startup request unit 212 as a functional element or a functional unit. The startup request unit 232 has the same configuration as the startup request unit 212, and executes processing according to the flowchart shown in FIG. 7 or 10. However, unlike the startup request unit 212, the startup request unit 232 determines in step S318 of FIG. 7 or 10 that malfunction occurs in the central ECU 136 when the startup completion notification is not received from the central ECU 136 within a predetermined time from the transmission of the first startup request in step S308. Thus, the entry ECU 506 detects that the central ECU 136 is in a state where the gateway processing cannot be performed due to the malfunction.

Then, when determining that malfunction occurs in the central ECU 136, the startup request unit 232 instructs the authentication processing unit 214 to perform the transmission of the first authentication result notification to the door control ECU 114 in step S332 of FIG. 7 or 10 via the second communication bus 134 using the spare NW communication device 218.

Thereby, the vehicle control system 500 operates in the emergency mode when the central ECU 136 cannot perform the gateway processing due to the malfunction. In the emergency mode operation, the first authentication result notification is directly transmitted from the entry ECU 506 to the door control ECU 114 only via the second communication bus 134 without using the malfunction central ECU 136. Therefore, in the vehicle control system 500, even when the gateway processing of the central ECU 136 is not executed due to the malfunction and the transmission message is not bridged from the first communication bus 132 to the second communication bus 134, the door control ECU 114 can unlock the door lock of the door 104 based on the result of the first authentication processing.

When the central ECU 136 malfunctions, the door control ECU 114 may not receive the second startup request. In this case, the door control ECU 114 starts to operate in response to the fact that the first authentication result notification transmitted from the entry ECU 106 in step 332 of FIG. 7 or 10 is received, and executes the door unlock processing (in FIG. 9, corresponding to YES in S500, NO in S502 and S504, and YES in S506).

In other words, since the door control ECU 114 does not start to operate before the reception of the first authentication result notification in this case, the vehicle control system 500 operates according to the normal mode operation.

Modification of Second Embodiment

In the vehicle control system 500 according to the second embodiment described above, the entry ECU 506 includes the spare NW communication device 218 connected to the second communication bus 134, and directly communicates with the door control ECU 114 via the second communication bus 134 during the emergency in which the central ECU 136 malfunctions. However, the communication during such an emergency may not necessarily have to be performed via the second communication bus 134.

Figure 13:
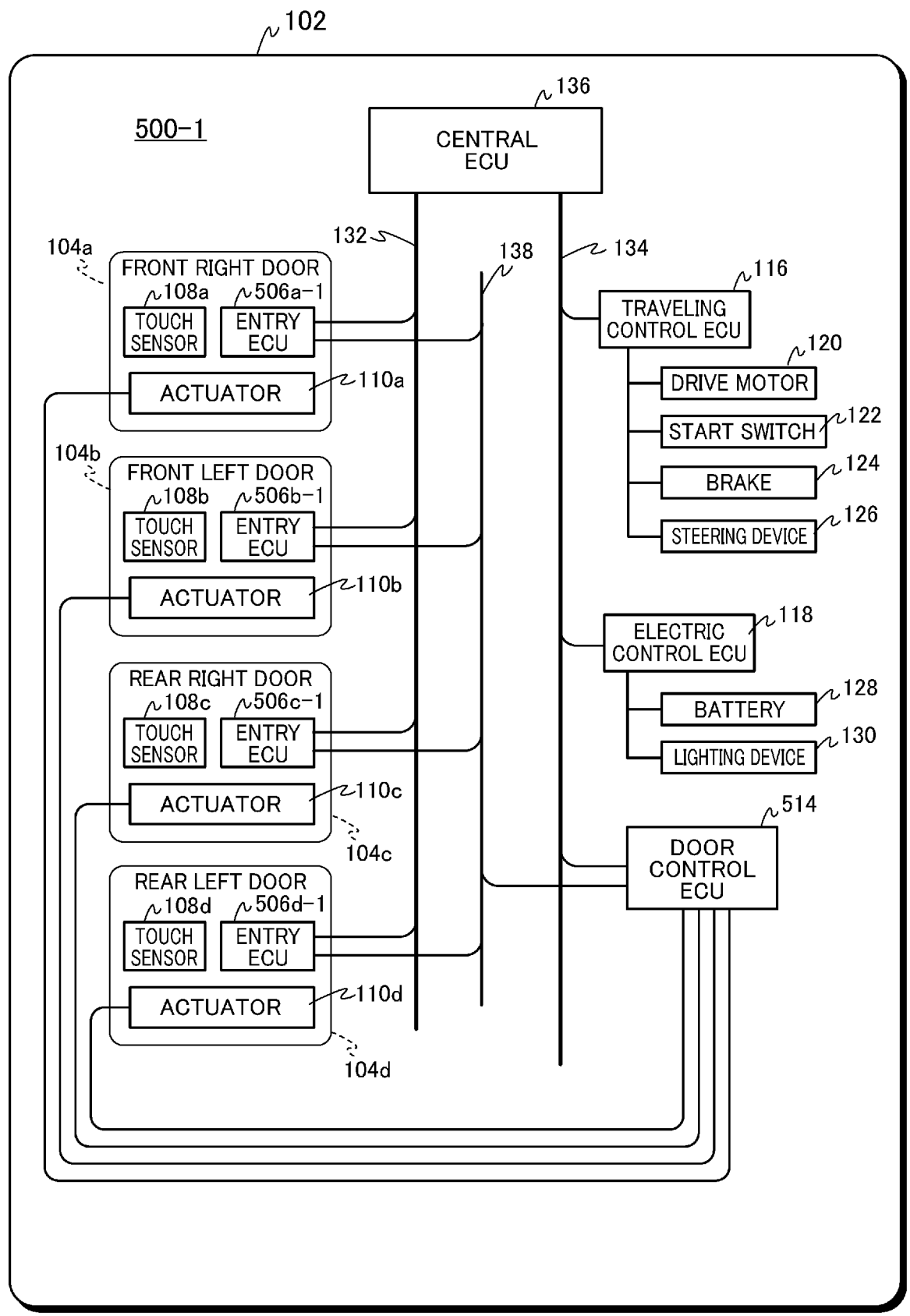
FIG. 13 is a diagram showing an example of a configuration of a vehicle control system according to a modification of the second embodiment.

For example, the above-described communication during the emergency may be performed by a spare communication path different from the first communication bus 132 and the second communication bus 134. A vehicle control system 500-1 shown in FIG. 13 is a modification of the vehicle control system 500 according to the second embodiment, and includes a spare communication path for communication in such an emergency. In FIG. 13, the same components as those of the vehicle control system 500 shown in FIG. 11 are denoted by the same reference numerals as those in FIG. 11, and will quote the description of FIG. 11 described above.

The vehicle control system 500-1 shown in FIG. 13 has the same configuration as the vehicle control system 500 shown in FIG. 11, except that a spare communication path 138 is provided in addition to the first communication bus 132 and the second communication bus 134. The spare communication path 138 is, for example, a LIN bus for communication in conformity with a LIN (Local Interconnect Network) communication standard.

The vehicle control system 500-1 is different from the vehicle control system 500 in that entry ECUs 506a-1, 506b-1, 506c-1, and 506d-1 are provided instead of the entry ECUs 506a, 506b, 506c, and 506d. Hereinafter, the entry ECUs 506a-1, 506b-1, 506c-1, and 506d-1 are collectively referred to as an entry ECU 506-1.

The vehicle control system 500-1 is different from the vehicle control system 500 in that a door control ECU 514 is provided instead of the door control ECU 114.

Figure 14:
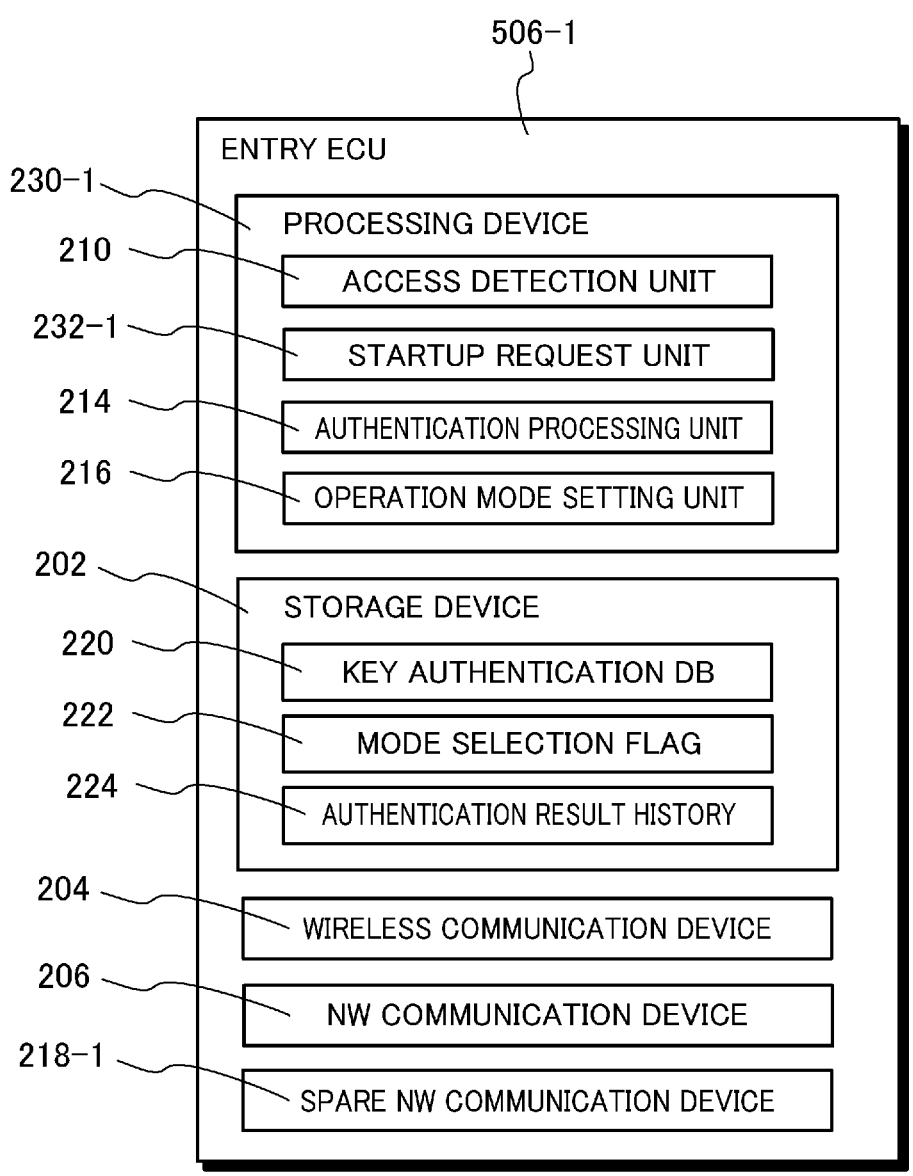
FIG. 14 is a diagram showing an example of a configuration of an entry ECU of the vehicle control system according to the modification shown in FIG. 13.

FIG. 14 is a diagram showing a configuration of the entry ECU 506-1. In FIG. 14, the same components as the entry ECU 506 shown in FIG. 12 are denoted by the same reference numerals as those in FIG. 12, and will quote the description of FIG. 12 described above.

The entry ECU 506-1 shown in FIG. 14 has the same configuration as the entry ECU 506 shown in FIG. 12, except that a processing device 230-1 is provided instead of the processing device 230. In addition, the entry ECU 506-1 shown in FIG. 14 has the same configuration as the entry ECU 506 shown in FIG. 12, except that a spare NW communication device 218-1 is provided instead of the spare NW communication device 218.

The spare NW communication device 218-1 is connected to the spare communication path 138 and performs communication via the spare communication path 138. The spare NW communication device 218-1 is, for example, a LIN transceiver that performs communication in conformity with a LIN communication standard, and more specifically, may be UART (Universal Asynchronous Receiver/Transmitter).

The processing device 230-1 has the same configuration as the processing device 230, except that a startup request unit 232-1 is provided instead of the startup request unit 232 as a functional element or a functional unit. The startup request unit 232-1 has the same configuration as the startup request unit 232, and executes the process according to the flowchart shown in FIG. 7 or 10. Further, similarly to the startup request unit 232, the startup request unit 232-1 determines in step S318 of FIG. 7 or 10 that malfunction occurs in the central ECU 136 when the startup completion notification is not received from the central ECU 136 within a predetermined time from the transmission of the first startup request in step S308. Thus, the entry ECU 506-1 detects that the central ECU 136 is in a state where the gateway processing cannot be performed due to the malfunction.

However, unlike the startup request unit 232, when determining that malfunction occurs in the central ECU 136, the startup request unit 232-1 instructs the authentication processing unit 214 to perform the transmission of the first authentication result notification to the door control ECU 114 in step S332 of FIG. 7 or 10 via the spare communication path 138 using the spare NW communication device 218-1.

Thereby, similarly to the vehicle control system 500, the vehicle control system 500-1 operates in the emergency mode based on the normal mode operation when the central ECU 136 cannot perform the gateway processing due to the malfunction. In the emergency mode operation, the first authentication result notification is directly transmitted from the entry ECU 506-1 to the door control ECU 114 via the spare communication path 138 without using the malfunction central ECU 136. Therefore, in the vehicle control system 500-1, even when the gateway processing of the central ECU 136 is not executed due to the malfunction and the transmission message is not bridged from the first communication bus 132 to the second communication bus 134, the door control ECU 114 can unlock the door lock of the door 104 based on the result of the first authentication processing.

Figure 15:
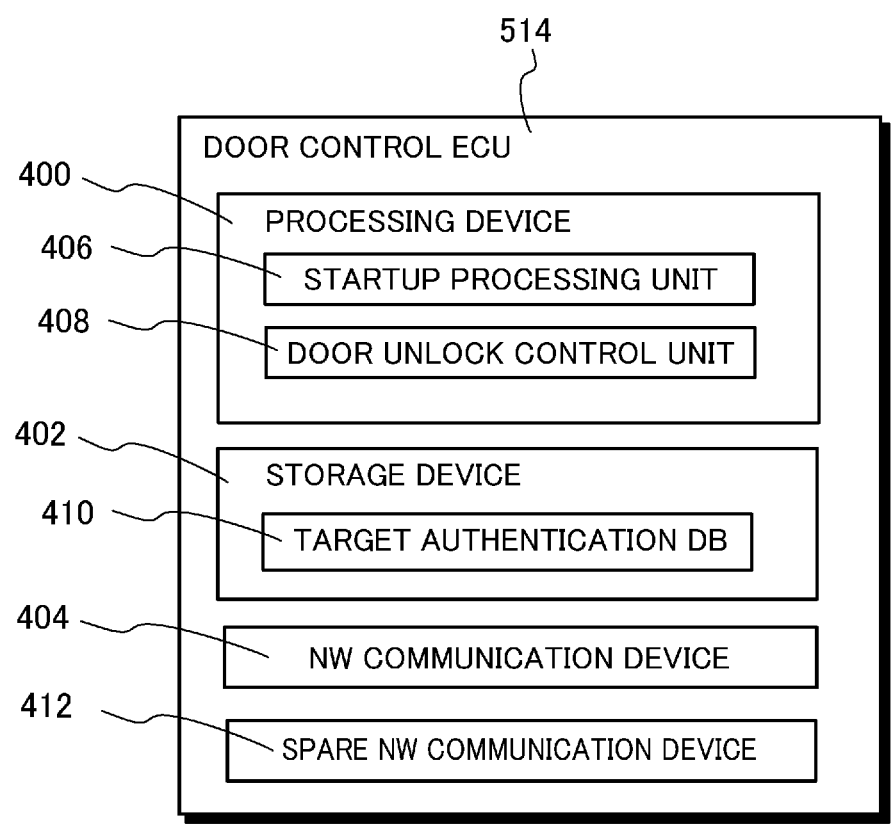
FIG. 15 is a diagram showing an example of a configuration of a door control ECU of the vehicle control system according to the modification shown in FIG. 13.

FIG. 15 is a diagram showing a configuration of the door control ECU 514. In FIG. 15, the same components as the entry ECU 506 shown in FIG. 6 are denoted by the same reference numerals as those in FIG. 6, and will quote the description of FIG. 6 described above.

The door control ECU 514 shown in FIG. 15 has the same configuration as the door control ECU 114 shown in FIG. 6, but is different from the door control ECU 114 shown in FIG. 6 in that a spare NW communication device 412 is further provided in addition to the NW communication device 404.

The spare NW communication device 412 is connected to the spare communication path 138 and performs communication via the spare communication path 138. Similarly to the spare NW communication device 218-1 of the entry ECU 506-1 described above, the spare NW communication device 412 is, for example, a LIN transceiver that performs communication in conformity with a LIN communication standard, and more specifically, may be UART.

The processing device 400 included in the door control ECU 514 receives a transmission message transmitted from another ECU from the NW communication device 404 or the spare NW communication device 412, and executes the same process as the process shown in FIG. 9.

The present invention is not limited to the configurations of the embodiments described above, and can be implemented in various aspects without departing from the gist of the invention.

For example, in each of the embodiments described above, the access to the vehicle 102 from the outside of the vehicle is a touch to the door handle of the door 104, but the access is not limited to the touch to the door handle. The access may be any motion made to the vehicle 102 from the outside of the vehicle. For example, the access may be an issuance of a voice command or a gesture that instructs unlocking of the door 104 and/or opening/closing of the door 104. In this case, the entry ECU 106, 506, or 506-1 (hereinafter, also referred to as the entry ECU 106) can detect the access using, for example, a microphone or a camera provided on the door 104 instead of the touch sensor 108.

In this case, the first authentication processing may be voice authentication processing for a voice command or gesture authentication processing of determining whether the gesture captured by the camera is a predetermined gesture.

In the embodiments described above, the entry ECU 106 constantly monitors the access to the vehicle 102 from the outside of the vehicle, but the operation of the entry ECU 106 is not limited thereto. The entry ECU 106 may shift to the sleep state when the access is not detected for a predetermined time, and may start to operate when the touch detection signal is received from the touch sensor 108.

In the embodiments described above, the vehicle control systems 100, 500, and 500-1 are configured to perform the smart entry operation using the entry ECU 106, the central ECU 136, and the door control ECU 114 (or 514), but may perform the smart entry operation using other ECUs. Examples of such other ECUs may include, as ECUs connected to the first communication bus 132, a camera ECU for controlling an out-of-vehicle capturing camera provided in a B-pillar of the vehicle 102 and a simple voice recognition ECU provided in the door 104.

In addition, example of other ECUs described above may include, as ECUs connected to the second communication bus 134, an image recognition ECU for a camera image and/or a voice recognition ECU capable of recognizing more voice command compared with the simple voice recognition ECU. In the case of including these ECUs, the entry ECU 106 can detect the access to the vehicle 102 from the outside of the vehicle by cooperating with the camera ECU and the simple voice recognition ECU, for example, and can transmit not only the first authentication result notification but also image data and voice data.

In the above case, in response to the reception of the first startup request from the entry ECU 106, the central ECU 136 can transmit the second startup request to the door control ECU 114 or 514 and can also transmit the startup request to the image recognition ECU and the voice recognition ECU.

In the second embodiment and the modification thereof described above, the entry ECUs 506 and 506-1 determine that the central ECU 136 malfunctions when the startup completion notification is not received from the central ECU 136 within a predetermined time after the transmission of the first startup request, but the malfunction determination condition for the central ECU 136 is not limited thereto.

For example, the entry ECUs 506 and 506-1 may determine the malfunction of the central ECU 136 based on whether the central ECU 136 receives the response message to be sent in response to the reception of any transmission message. Alternatively, when the startup completion notification or the response message from the central ECU 136 for the transmission of the first startup request is not received within the predetermined time after the transmission, the entry ECUs 506 and 506-1 may determine the malfunction of the central ECU 136 by transmitting the first startup request several times within the predetermined number of times as an upper limit.

Further, the determination of malfunction in the central ECU 136 as described above may be performed in the first embodiment and the modification thereof. In this case, the entry ECU 106 may cause a speaker (not shown) to make a buzzer sound when it is determined that the malfunction occurs in the central ECU 136, thereby notifying the user of the malfunction.

In the second embodiment and the modification thereof, the emergency mode operation is performed based on the normal mode operation, but the operation in the emergency mode is not limited thereto. The operation in the emergency mode may be performed based on the operation in the early startup mode. For example, each of the startup request units 232 and 232-1 of the entry ECUs 506 and 506-1 may directly transmit the second startup request to the door control ECU 114 via the second communication bus 134 or the spare communication path 138 by each of the spare NW communication devices 218 and 218-1 when the startup completion notification is not received from the central ECU 136 within the predetermined time in step S318. Thus, since the door control ECU 114 can execute the startup processing in response to the reception of the second startup request, the startup processing is completed before the first authentication result notification is received, and the door unlock processing based on the first authentication result notification can be started promptly.

In the vehicle control system 100, 500, of 500-1 according to each of the embodiments described above, the entry ECU 106, 506, or 506-1 sets the mode selection flag 222 to the early startup mode value (step S330 after YES in step S328 of FIG. 7 or 10) when the authentication result of the first authentication processing is success, but the shift condition from the normal mode to the early startup mode is not limited thereto. For example, the entry ECU 106, 506, or 506-1 may set the mode selection flag 222 to the early startup mode value when the opening/closing of the door 104 is detected by a sensor (not shown) that detects the opening/closing of the door 104. Alternatively, the entry ECU 106, 506, or 506-1 may set the mode selection flag 222 to the early startup mode value when the traveling control ECU 116 detects the fact that the start switch of the drive motor 120 is turned on.

In the vehicle control system 100, 500, of 500-1 according to each of the embodiments described above, the entry ECU 106 receives the startup completion notification from the central ECU 136 after transmitting the first startup request, and then transmits the first authentication result notification, but the operation of the entry ECU 106 is not limited thereto. The entry ECU 106 may transmit the first authentication result notification without waiting for the reception of the startup completion notification from the central ECU 136 after transmitting the first startup request. In this case, the central ECU 136 may record the continuously received transmission message in a memory (not shown) such as a reception buffer and sequentially process the message.

Similarly, the central ECU 136 receives the startup completion notification from the door control ECU 114 after transmitting the second startup request, and then transmits the first authentication result notification, but the operation of the central ECU 136 is not limited thereto. The central ECU 136 may transmit first authentication result notification without waiting for the reception of the startup completion notification from the door control ECU 114 after transmitting the second startup request. In this case, the door control ECU 114 may record the continuously received transmission message in a memory (not shown) such as a reception buffer and sequentially process the message.

As described above, the vehicle control system 100 according to the first embodiment includes the entry ECU 106 and the door control ECU 114 for controlling locking and unlocking of the door 104 of the vehicle 102. Further, the vehicle control system 100 includes the first communication bus 132 to which the entry ECU 106 is connected and the second communication bus 134 to which the door control ECU 114 is connected. Further, the vehicle control system 100 includes the central ECU 136 having the gateway function of managing the signal transmission between the first communication bus 132 and the second communication bus 134. Then, the entry ECU 106 transmits the first startup request, which instructs to start up the central ECU 136, to the central ECU 136 before execution of the first authentication processing when detecting the access. The central ECU 136 transmits the second startup request, which instructs to start up the door control ECU 114, to the door control ECU 114 in response to the reception of the first startup request.

With such a configuration, in the vehicle control system 100 in which the smart entry function is realized by the plurality of ECUs, it is possible to improve the responsiveness from the unlocking instruction of the vehicle door to the completion of unlocking when these ECUs are in the sleep state.

In the vehicle control system 100, the entry ECU 106 does not transmit the first startup request to the central ECU 136 when the number of times of a result of the first authentication processing being consecutive failure exceeds the predetermined number of times. With such a configuration, for example, when the vehicle 102 is parked in a narrow place with a lot of traffic and the body of a person who is not an authorized user of the vehicle 102 repeatedly contacts with the door handle of the door 104, it is possible to prevent the central ECU 136 and the door control ECU 114 from being started up unnecessarily.

Further, when detecting the access, the entry ECU 106 performs the first authentication processing based on the identification information (for example, a key code) received from the portable device existing within the range of the first predetermined distance from the door 104 of the vehicle 102. With such a configuration, in cooperation with the portable device of the person with a high probability of the access, it is possible to easily execute the first authentication processing of determining whether the person is the authorized user who is allowed to unlock the door of the vehicle 102.

In addition, the entry ECU 106 may communicate with the portable device existing within the range of the second predetermined distance longer than the first predetermined distance from the vehicle 102, and may execute the second authentication processing based on the identification information (for example, a key code) received from the portable device. Then, when the result of the second authentication processing is success, the entry ECU 106 transmits the first startup request before execution of the first authentication processing. In addition, when the result of the second authentication processing is failure, the entry ECU 106 may not transmit the first startup request before execution of the first authentication processing.

With such a configuration, when the authorized user exists in the vicinity of the vehicle 102 and there is a high probability that the access to the vehicle 102 (that is, a door unlocking instruction) is performed by the authorized user or under the supervision of the authorized user, it is possible to operate the vehicle control system 100 in the early startup mode to support the prompt riding of the authorized user.

Further, the vehicle control system 500 according to the second embodiment described above includes a communication path between the entry ECU 506 and the door control ECU 114 without the central ECU 136. Then, the entry ECU 506 transmits the result of the first authentication processing to the door control ECU 114 via the communication path when detecting the malfunction of the central ECU 136.

With such a configuration, even when the central ECU 136 malfunctions, since the door 104 can be unlocked in response to the detection of the access to the vehicle 102 from the outside of the vehicle, it is possible to prevent a situation in which the authorized user cannot ride on the vehicle 102.

In the vehicle control system 500, the communication path is the second communication bus 134, and the entry ECU 506 is connected to the first communication bus 132 and the second communication bus 134. With such a configuration, even during the malfunction of the central ECU 136, the door 104 can be unlocked in response to the access of the authorized user from the outside of the door in a state where a new communication path other than the first communication bus 132 and the second communication bus 134 is not provided and a new NW communication device is not provided in the door control ECU 114.

In the vehicle control system 500, when detecting the malfunction of the central ECU 136, the entry ECU 506 transmits the result of the first authentication processing to the door control ECU via the second communication bus 134 as the communication path without transmitting the second startup request to the door control ECU 114 via the second communication bus 134 as the communication path.

With such a configuration, during the malfunction of the central ECU 136, since the door control ECU 114 starts up after waiting for the first authentication processing in the entry ECU 106, the unlocking operation can be performed safely and with less waste of power consumption.

In addition, the entry ECU 106 of the vehicle control system 100 processes the access to the vehicle 102 from the outside of the vehicle 102. The entry ECU 106 includes the access detection unit 210 for detecting the access, the authentication processing unit 214 for executing the first authentication processing on the detected access, and the startup request unit 212 for transmitting the first startup request that instructs another ECU to start up. Then, the startup request unit 212 transmits the first startup request before execution of the first authentication processing when the access is detected.

With such a configuration, it is possible to use the entry ECU 106 to easily configure the vehicle control system 100 having two operation modes of the normal mode operation and the early startup mode operation.

Further, the door 104 of the vehicle 102 includes the entry ECU 106. With such a configuration, since the entry ECU 106 is provided for each door 104, even when the entry ECU 106 of one door 104 malfunctions, the unlocking operation of the other door 104 can be executed.

REFERENCE SIGNS LIST 100 vehicle control system
102 vehicle
104 door
104a front right door
104b front left door
104c rear right door
104d rear left door
106, 106a, 106b, 106c, 106d, 506, 506a, 506b, 506c, 506d, 506-1, 506a-1, 506b-1, 506c-1, 506d-1 entry ECU
108, 108a, 108b, 108c, 108d touch sensor
110, 110a, 110b, 110c, 110d actuator
114, 514 door control ECU
116 traveling control ECU
118 electric control ECU
120 drive motor
122 start switch
124 brake
126 steering device
128 battery
130 lighting device
132 first communication bus
134 second communication bus
136 central ECU
138 spare communication path
200, 230, 230-1, 300, 400 processing device
202, 302, 402 storage device
204 wireless communication device
206, 404 NW communication device
210 access detection unit
212, 232, 232-1 startup request unit
214 authentication processing unit
216 operation mode setting unit
218, 218-1, 412 spare NW communication device
220 user authentication DB
222 mode selection flag
224 authentication result history
304 first NW communication device
306 second NW communication device
320, 406 startup processing unit
322 startup request unit
324 gateway processing unit
408 door unlock control unit
410 target authentication DB

What is claimed is:

1. A vehicle control system mounted on a vehicle, the vehicle control system comprising:
an entry ECU that detects access to the vehicle from an outside of the vehicle and executes first authentication processing on the access which is detected;
a first communication bus to which the entry ECU is connected;
a door control ECU that controls locking and unlocking of a door of the vehicle;
a second communication bus to which the door control ECU is connected; and
a central ECU having a gateway function of managing signal transmission between the first communication bus and the second communication bus, wherein
the entry ECU transmits a first startup request, which instructs to start up the central ECU, to the central ECU before executing the first authentication processing when the access is detected, and
the central ECU transmits a second startup request, which instructs to start up the door control ECU, to the door control ECU in response to reception of the first startup request.

2. The vehicle control system according to claim 1, wherein
the entry ECU does not transmit the first startup request when the number of times of a result of the first authentication processing being consecutive failure exceeds a predetermined number of times.

3. The vehicle control system according to claim 1, wherein
when the access is detected, the entry ECU performs the first authentication processing based on identification information received from a portable device existing within a range of a first predetermined distance from the vehicle.

4. The vehicle control system according to claim 3, wherein
the entry ECU communicates with a portable device existing within a range of a second predetermined distance longer than the first predetermined distance from the vehicle, and executes second authentication processing based on identification information received from the portable device, and
when a result of the second authentication processing is success, the entry ECU transmits the first startup request before executing the first authentication processing.

5. The vehicle control system according to claim 3, wherein
the entry ECU communicates with a portable device existing within a range of a second predetermined distance longer than the first predetermined distance from the vehicle, and executes second authentication processing based on identification information received from the portable device, and
when a result of the second authentication processing is failure, the entry ECU does not transmit the first startup request before executing the first authentication processing.

6. The vehicle control system according to claim 1, further comprising:
a communication path between the entry ECU and the door control ECU without the central ECU, wherein
the entry ECU transmits the result of the first authentication processing to the door control ECU via the communication path when malfunction of the central ECU is detected.

7. The vehicle control system according to claim 6, wherein
the entry ECU is connected to the first communication bus and the second communication bus, and
the communication path is the second communication bus.

8. The vehicle control system according to claim 6, wherein when the malfunction of the central ECU is detected, the entry ECU transmits the result of the first authentication processing to the door control ECU via the communication path without transmitting the startup request to the door control ECU via the communication path.

9. An entry ECU that processes access to a vehicle from an outside of the vehicle, the entry ECU comprising:

an access detection unit that detects the access;

an authentication processing unit that executes an authentication process on the access which is detected; and a startup request unit that transmits a startup request that instructs to start up another ECU, wherein the startup request unit transmits the startup request before execution of the authentication process when the access is detected.

10. A vehicle door to be assembled to a vehicle, the vehicle door comprising:

the entry ECU according to claim 9.

* * * * *